United States Patent
Patil et al.

(10) Patent No.: US 10,640,613 B2
(45) Date of Patent: May 5, 2020

(54) THERMOPLASTIC POLYIMIDES, METHOD FOR THE MANUFACTURE THEREOF, AND ARTICLES PREPARED THEREFROM

(71) Applicant: SABIC Global Technologies B.V., Bergen op Zoom (NL)

(72) Inventors: Dadasaheb V. Patil, Evansville, IN (US); Manojkumar Chellamuthu, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/073,518

(22) PCT Filed: Jan. 30, 2017

(86) PCT No.: PCT/US2017/015592
§ 371 (c)(1),
(2) Date: Jul. 27, 2018

(87) PCT Pub. No.: WO2017/132656
PCT Pub. Date: Aug. 3, 2017

(65) Prior Publication Data
US 2019/0040201 A1    Feb. 7, 2019

Related U.S. Application Data

(60) Provisional application No. 62/288,751, filed on Jan. 29, 2016.

(51) Int. Cl.
*C08G 73/10*    (2006.01)
*C08L 79/08*    (2006.01)
(Continued)

(52) U.S. Cl.
CPC .......... *C08G 73/1053* (2013.01); *B29C 67/24* (2013.01); *C08G 73/105* (2013.01);
(Continued)

(58) Field of Classification Search
CPC .... C08G 73/107; C08G 73/1003; C08G 8/02; C07C 37/66; C07G 1/02; C07D 401/00
See application file for complete search history.

(56) References Cited

U.S. PATENT DOCUMENTS 3,803,085 A    4/1974    Takehoshi et al.
3,991,004 A    11/1976   Takekoshi et al.
(Continued)

FOREIGN PATENT DOCUMENTS

EP    0401606 A1    12/1990
EP    2231749 A1    9/2010
(Continued)

OTHER PUBLICATIONS

International Search Report for International Application PCT/US2017/038135; International filing date Jun. 19, 2017; dated Sep. 13, 2017; 5 pages.
(Continued)

*Primary Examiner* — Shane Fang
(74) *Attorney, Agent, or Firm* — Cantor Colburn LLP

(57) ABSTRACT

A polymer composition including a polyetherimide comprising repeating units of formula (1) and formula (2) [Formula should be inserted here] wherein the repeating units of formula (1) are present in an amount of at least 10 mole %, preferably 20 to 100 mole %, Z is independently at each occurrence derived from a biphenol; Z' is independently at each occurrence a group of formulas (3) to (13) as defined herein, preferably bisphenol A, 1,2-dihydroxybenzene, 1,1-bis(4-hydroxyphenyl)-1-phenyl-ethane, isophorone bisphenol (1,1-bis(4-hydroxyphenyl)-3,3,5-trimethylcyclohexane), spirobiindane bisphenol, dimethylindanone bisphenol, 3,3'-dimethylbisphenol cyclohexane, or fluorenone bisphenol; and R is independently at
(Continued)

each occurrence as a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof; wherein the polyetherimide has a Tg of greater than 200° C.

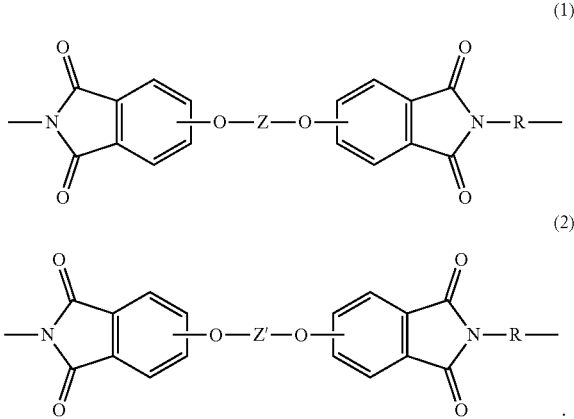

20 Claims, 2 Drawing Sheets

(51) Int. Cl.
  *B29C 67/24* (2006.01)
  *B29K 79/00* (2006.01)
(52) U.S. Cl.
  CPC .......... *C08G 73/1046* (2013.01); *C08L 79/08* (2013.01); *B29K 2079/085* (2013.01)

(56) References Cited

U.S. PATENT DOCUMENTS

| | | | |
|---|---|---|---|
| 4,340,545 A | 7/1982 | Webb et al. | |
| 4,864,034 A | 9/1989 | Cella et al. | |
| 4,950,727 A | 8/1990 | Guggenheim et al. | |
| 4,980,453 A | 12/1990 | Brunelle et al. | |
| 5,106,938 A * | 4/1992 | Bookbinder | C08G 73/1053 528/125 |
| 5,229,482 A | 7/1993 | Brunelle et al. | |
| 5,872,294 A | 2/1999 | Caringi et al. | |
| 6,570,038 B1 | 5/2003 | Caringi et al. | |
| 6,919,418 B2 | 7/2005 | Khouri et al. | |
| 2007/0142569 A1 | 6/2007 | Donovan et al. | |
| 2008/0319161 A1 | 12/2008 | Hall | |
| 2009/0018242 A1 | 1/2009 | Kailasam et al. | |
| 2013/0053489 A1* | 2/2013 | Gallucci | C08K 5/13 524/128 |
| 2013/0108851 A1 | 5/2013 | Kuhlman et al. | |
| 2013/0108852 A1 | 5/2013 | Kuhlman et al. | |
| 2014/0099510 A1* | 4/2014 | Chiong | C07D 209/48 428/473.5 |

FOREIGN PATENT DOCUMENTS

| | | |
|---|---|---|
| JP | 6010160 B2 | 10/2016 |
| WO | 2013028609 A1 | 2/2013 |
| WO | 2017132656 A1 | 8/2017 |

OTHER PUBLICATIONS

International Search Report of the International Searching Authority for International Application No. PCT/US2017/015592; International filing date: Jan. 30, 2017; dated May 4, 2017; 6 pages.
Takekoshi, T. et al., "Polyetherimides. I. Preparation of Dianhydrides Containing Aromatic Ether Groups"; Journal of Polymer Science: Polymer Symposium 23, 1759-1769 (1985).
Takekoshi, T. et al., "Polyetherimides. II. High-Temperature Solution Polymerization"; Journal of Polymer Science: Polymer Symposium 74, 93-108 (1986).
Takekoshi, T., "Synthesis of High Performance Aromatic Polymers via Nucleophilic Nitro Desplacement Reaction", Polymer Journal, vol. 19, No. 1, pp. 191-202 (1987); pp. 191-202.
Takekoshi, Tohru, "Polyimides", Advanced in Polymer Science 94; Springer-Verlag Berlin Heidelberg 1990; pp. 1-25.
Written Opinion of the International Searching Authority for International Application No. PCT/US2017/038135; International Filing Date: Jun. 19, 2017; dated Sep. 13, 2017; 6 pages.
Written Opinion of the International Searching Authority for International Application No. PCT/US2017/015592; International filing date: Jan. 30, 2017; dated May 4, 2017; 8 pages.

* cited by examiner

THERMOPLASTIC POLYIMIDES, METHOD FOR THE MANUFACTURE THEREOF, AND ARTICLES PREPARED THEREFROM

CROSS-REFERENCE TO RELATED APPLICATIONS

This application is a National Stage application of PCT/US2017/015592, filed Jan. 30, 2017, which claims the benefit of U.S. Provisional Application No. 62/288,751, filed Jan. 29, 2016, both of which are incorporated by reference herein in their entirety.

BACKGROUND

Polyetherimides are a class of high performance polymers that can be processed to make molded articles, fibers, films, foams, stock shapes, and the like. Polyetherimides further have high strength, toughness, heat resistance, modulus, and broad chemical resistance, and so are widely used in industries as diverse as automotive, telecommunication, aerospace, electrical/electronics, transportation, and healthcare. Polyetherimides have shown versatility in various manufacturing processes, proving amenable to techniques including injection molding, extrusion, and thermoforming, to prepare various articles.

Polyetherimides are also known for high heat distortion temperatures and high glass transition temperatures, making their use as coatings, molded articles, composites, and the like very attractive where high temperature resistance is desired. As such, these polymers have found wide use in shaped articles, sheet materials, and coatings for use in challenging physical environments such as aerospace applications, lighting applications, and automotive applications. Due to their high glass transition temperature and high melt viscosity, however, polyetherimides can be difficult to process into finished products.

There remains a continuing need for a polyetherimide having high heat performance, reflow capability, excellent dimensional stability, and low water uptake, in particular for optoelectronic applications.

BRIEF DESCRIPTION

In an aspect, a polymer composition comprises a polyetherimide comprising repeating units of formula (1) and formula (2)

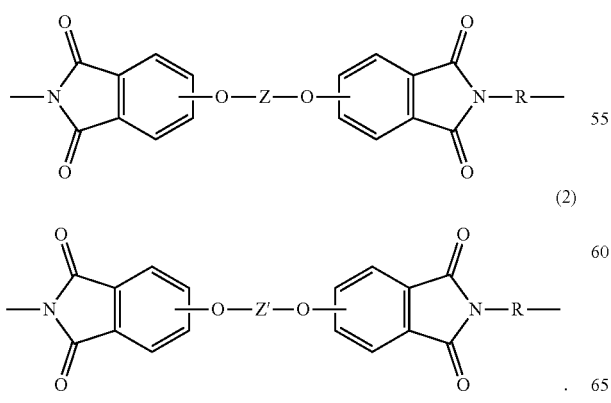

wherein the repeating units of formula (1) are present in an amount of at least 10 mole %, preferably 20 to 100 mole %, more preferably 20 to 80 mole %; Z is independently at each occurrence derived from a biphenol, preferably a 4,4'-biphenol; Z' is independently at each occurrence a group of formulas (3) to (13)

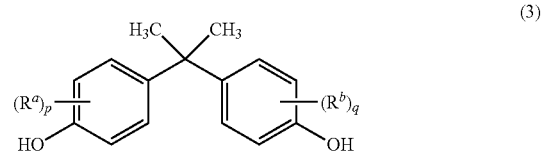

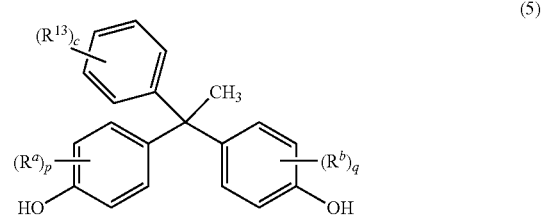

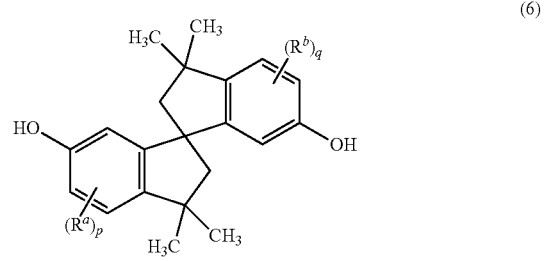

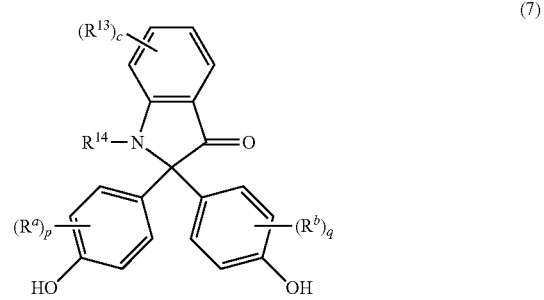

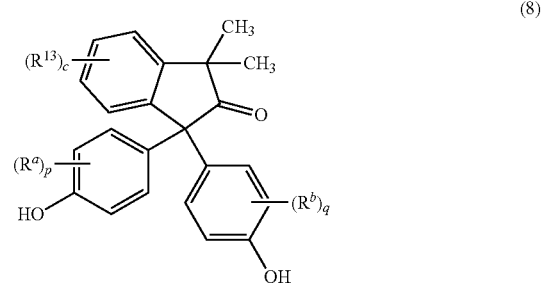

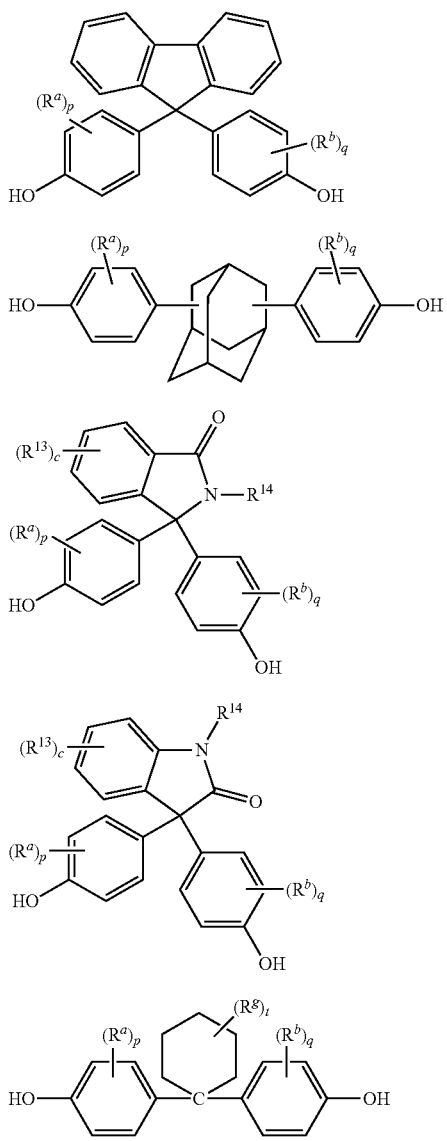

(9)

(10)

(10)

(12)

(13)

wherein $R^a$ and $R^b$ at each occurrence are each independently halogen, $C_{1-12}$ alkyl, $C_{2-12}$ alkenyl, $C_{3-8}$ cycloalkyl, or $C_{1-12}$ alkoxy; p and q at each occurrence are each independently 0 to 4; $R^{13}$ at each occurrence is independently halogen or $C_{1-6}$ alkyl; c at each occurrence is independently 0 to 4; $R^g$ at each occurrence is independently halogen or $C_{1-12}$ alkyl, or two $R^g$ groups together with the carbon atoms to which they are attached form a four-, five, or six-membered cycloalkyl group; and t is 0 to 10, preferably a group derived from bisphenol A, 1,2-dihydroxybenzene, 1,1-bis(4-hydroxyphenyl)-1-phenyl-ethane, isophorone bisphenol (1,1-bis(4-hydroxyphenyl)-3,3,5-trimethylcyclohexane), spirobiindane bisphenol, dimethylindanone bisphenol, 3,3'-dimethylbisphenol cyclohexane, or fluorenone bisphenol; and R is independently at each occurrence as a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof; wherein the polyetherimide has a Tg of greater than 200° C., or 220 to 290° C., or 250 to 290° C.

A method for the manufacturer of the polyetherimide compositions reacting an alkali metal salt of a dihydroxy aromatic compound of the formula $M^{+-}O$—Z—$O^{-+}M$ and $M^{+-}O$—Z'—$O^{-+}M$ with a bis(halo)phthalimide composition, preferably in a molar ratio from 1.0:0.9 to 0.9:1.0, the bis(halo)phthalimide composition comprising, based on the weight of the bis(halophthalimide) composition, at least 15 wt. % of a 3,3-bis(halophthalimide) of the formula

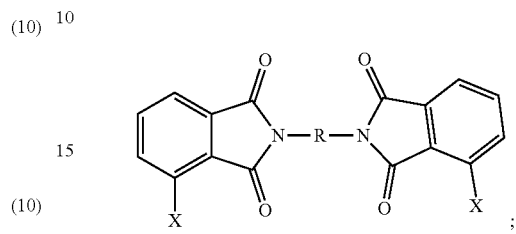

more than 47 to less than 85 wt. % of a 4,3'-bis(halophthalimide) of the formula

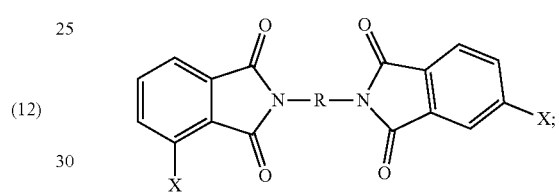

more than 0 to less than 27 wt. % of a 4,4'-bis(halophthalimide) of the formula

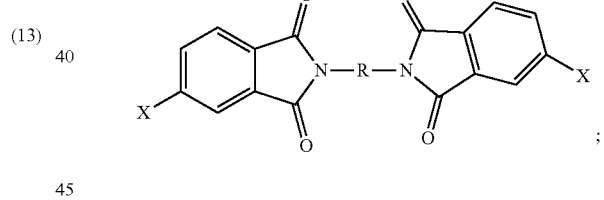

under conditions effective to provide the polyetherimide, and wherein in the foregoing formulas is an alkali metal, Z is independently at each occurrence derived from a biphenol group, preferably a 4,4'-biphenol group, Z' is independently at each occurrence a group derived from spirobiindane bisphenol, bisphenol A, 1,2-dihydroxybenzene, isophorone bisphenol, 1,1-bis(4-hydroxyphenyl)-1-phenyl-ethane, dimethylindanone bisphenol, 3,3'-dimethylbisphenol cyclohexane, or fluorenone bisphenol, X is independently at each occurrence fluoro, chloro, bromo, iodo or nitro, and R is independently at each occurrence a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof.

A method for the manufacturer of the polyetherimide composition comprises reacting an aromatic bis(ether phthalic anhydride) of formula (12) and (13)

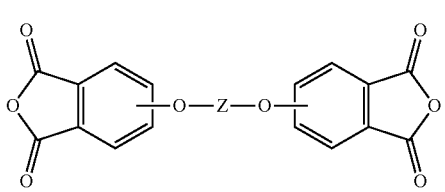

(12)

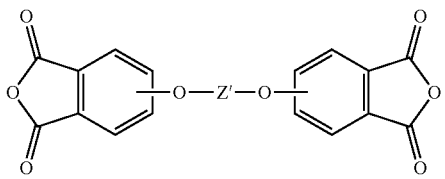

(13)

with an aromatic diamine of the formula $H_2N$—R—$NH_2$ to provide a polyetherimide, wherein in the foregoing formulas Z is independently at each occurrence derived from a biphenol group, preferably a 4,4'-biphenol group; and Z' is independently at each occurrence a group derived from bisphenol A, 1,2-dihydroxybenzene, 1,1-bis(4-hydroxyphenyl)-1-phenyl-ethane, isophorone bisphenol (1,1-bis(4-hydroxyphenyl)-3,3,5-trimethylcyclohexane), spirobiindane bisphenol, dimethylindanone bisphenol, 3,3'-dimethylbisphenol cyclohexane, or fluorenone bisphenol; R is independently at each occurrence a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof.

Articles comprising the above-described polyetherimide compositions and methods of manufacture of the articles are also described.

The above described and other features are exemplified by the following figures and detailed description.

BRIEF DESCRIPTION OF THE DRAWINGS

The following figures represent exemplary embodiments.

DETAILED DESCRIPTION

Figure 1:
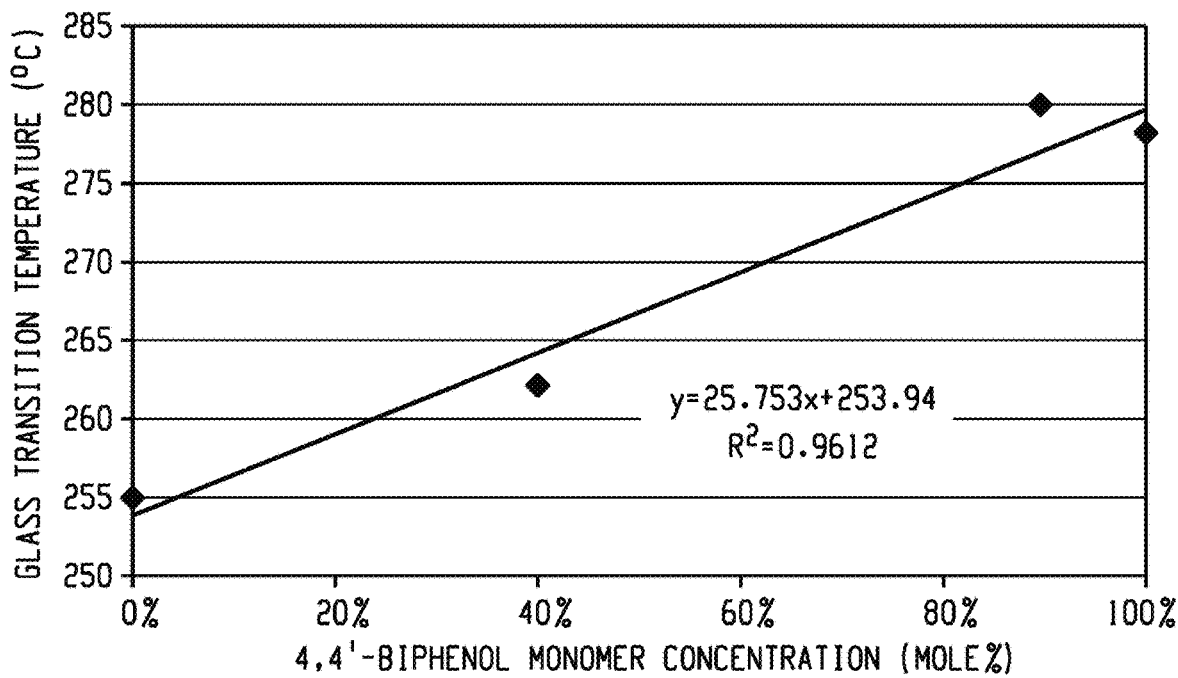
FIG. 1 shows the dependence of glass transition temperature (Tg, ° C.) on the concentration of 4,4'-biphenol monomer (given in mole percent) in a polyetherimide.

The present inventors have discovered a polyetherimide having a particular composition can provide a desirable combination of properties, making the polyetherimides suitable for use in optoelectronic applications. In particular, polyetherimides comprising biphenol moieties were unexpectedly found to provide a polyetherimide having high heat performance, low water uptake, low coefficient of thermal expansion, good mechanical properties, and improved flow at high shear. Thus, an improvement in high heat polyetherimides is provided by the present disclosure.

Accordingly, a polymer composition comprising a polyetherimide having particular repeat units represents one aspect of the present disclosure. The polyetherimide comprises repeating units of formula (1) and formula (2)

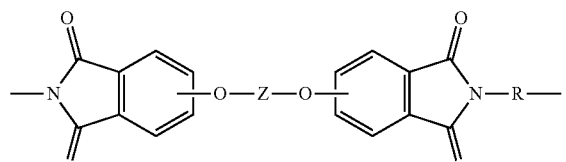

(1)

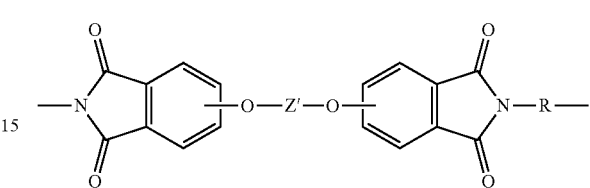

(2)

The polyetherimide comprises more than 1, for example 10 to 1000, or 10 to 500 repeating units of each of formula (1) and formula (2). In formulas (1) and (2), each R is independently the same or different, and is a substituted or unsubstituted divalent organic group, such as a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof, in particular a divalent group of one or more of the following formulas (2)

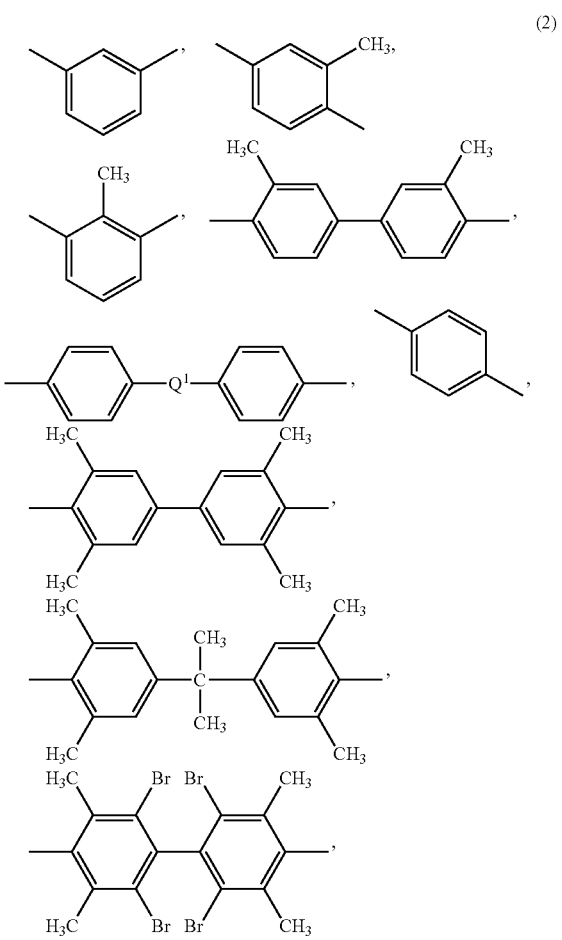

(2)

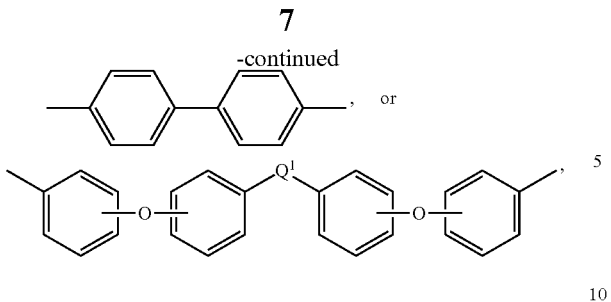

wherein $Q^1$ is —O—, —S—, —C(O)—, —SO$_2$—, —SO—, —P(R$^a$)(=O)— wherein R$^a$ is a C$_{1-8}$ alkyl or C$_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In some embodiments, R is m-phenylene.

Further in formula (1), Z is independently at each occurrence a biphenyl group, in particular a group derived from 4,4'-biphenol. The divalent bonds of the —O—Z—O— group can be in the 3,3', 3,4', 4,3', or the 4,4' positions, preferably the 4,4' position.

In formula (2), Z' is independently at each occurrence a group derived from an aromatic diol of formulas (3) to (13):

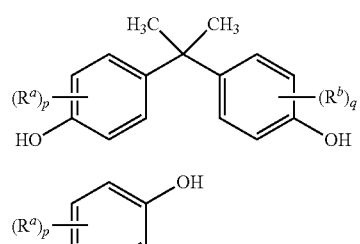
(3)

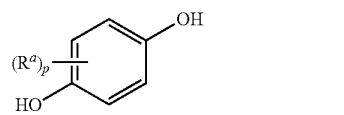
(4)

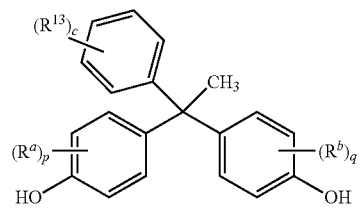
(5)

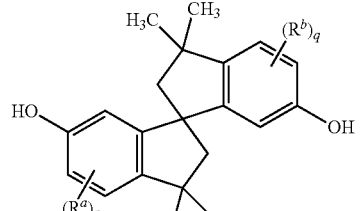
(6)

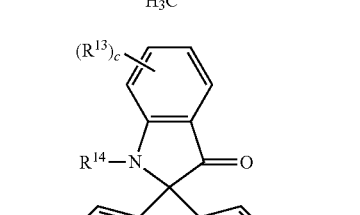
(7)

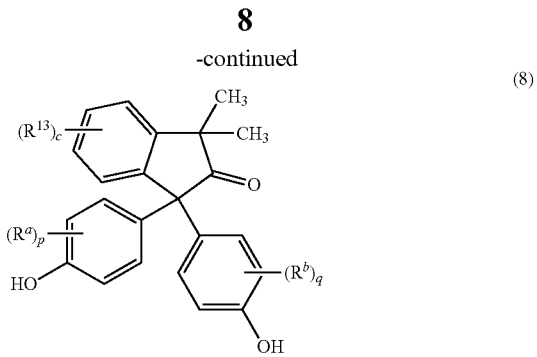
(8)

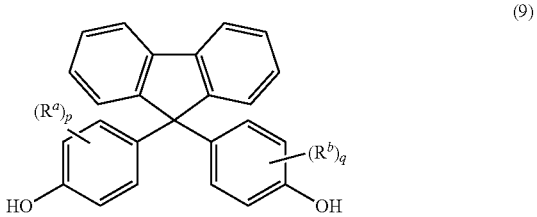
(9)

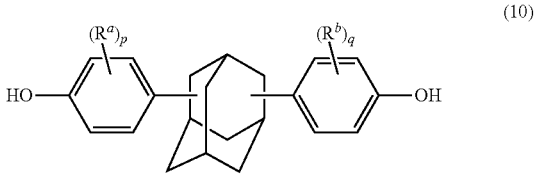
(10)

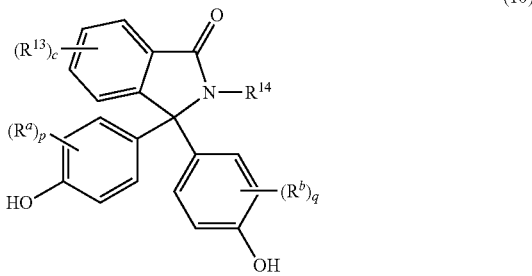
(10)

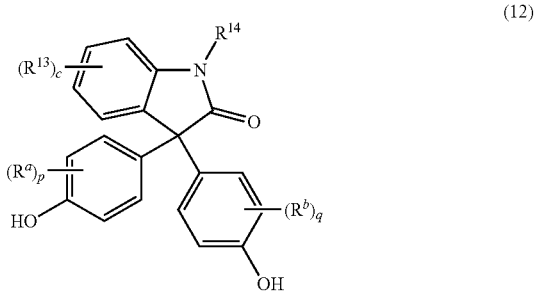
(12)

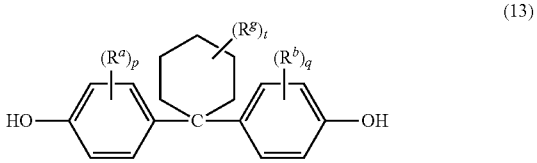
(13)

wherein R$^a$ and R$^b$ at each occurrence are each independently halogen, C$_{1-12}$ alkyl, C$_{2-12}$ alkenyl, C$_{3-8}$ cycloalkyl, or C$_{1-12}$ alkoxy; p and q at each occurrence are each independently 0 to 4; R$^{13}$ at each occurrence is independently halogen or C$_{1-6}$ alkyl; c at each occurrence is independently 0 to 4; R$^g$ at each occurrence is independently halogen or C$_{1-12}$ alkyl, or two R$^g$ groups together with the carbon atoms to which they are attached form a four-, five-, or six-membered cycloalkyl group; and t is 0 to 10.

In some embodiments, $R^a$ and $R^b$ at each occurrence are each independently halogen, $C_{1-6}$ alkyl, $C_{2-6}$ alkenyl, $C_{4-6}$ cycloalkyl, or $C_{1-6}$ alkoxy; $R^{14}$ at each occurrence is independently $C_{1-6}$ alkyl, phenyl, or phenyl substituted with up to five halogens or $C_{1-6}$ alkyls; p and q at each occurrence are each independently 0 to 2; $R^{13}$ at each occurrence is independently halogen or $C_{1-3}$ alkyl; c at each occurrence is independently 0 to 2; $R^g$ at each occurrence is independently halogen or $C_{1-6}$ alkyl, or two $R^g$ groups together with the carbon atoms to which they are attached form a five or six-membered cycloalkyl group; and t is 0 to 5.

In some embodiments, $R^a$ and $R^b$ at each occurrence are each independently halogen, $C_{1-3}$ alkyl, $C_{2-4}$ alkenyl, or $C_{1-3}$ alkoxy; $R^{14}$ at each occurrence is independently $C_{1-3}$ alkyl, phenyl, or phenyl substituted with up to two halogens or $C_{1-3}$ alkyls; p and q at each occurrence are each independently 0 or 1; $R^{13}$ at each occurrence is independently $C_{1-3}$ alkyl; c at each occurrence is independently 0 or 1; $R^g$ at each occurrence is independently $C_{1-3}$ alkyl or two $R^g$ groups together with the carbon atoms to which they are attached form a five, or six-membered cycloalkyl group; and t is 0 to 5.

In preferred embodiments, $R^a$ and $R^b$ at each occurrence are each independently $C_{1-3}$ alkyl; $R^{14}$ at each occurrence is independently a phenyl, or phenyl substituted with up to two methyl groups; p and q at each occurrence are each independently 0 or 1; c at each occurrence is 0; $R^{14}$ at each occurrence is independently methyl or phenyl; $R^g$ at each occurrence is independently methyl; and t is 0 to 4.

In still another embodiment, $R^a$ and $R^b$ at each occurrence are each methyl; $R^{14}$ at each occurrence is independently $C_{1-3}$ alkyl or phenyl; p and q at each occurrence are each independently 0 or 1; and c is zero.

In a specific embodiment, Z' is derived from bisphenol A, 1,2-dihydroxybenzene, 1,1-bis(4-hydroxyphenyl)-1-phenyl-ethane, isophorone bisphenol (1,1-bis(4-hydroxyphenyl)-3,3,5-trimethylcyclohexane), spirobiindane bisphenol, dimethylindanone bisphenol, 3,3'-dimethylbisphenol cyclohexane, fluorenone bisphenol, or a combination comprising at least one of the foregoing.

In some embodiments, Z' is a group derived from a spirobiindane of formula (7a)

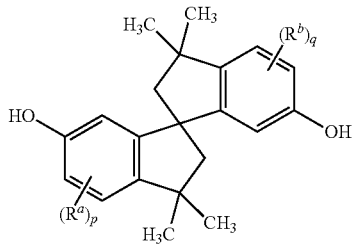

(7a)

wherein each $R^a$ and $R^b$ is independently a $C_{1-4}$ alkyl group or a halogen, and p and q is each independently is 0 to 3 (e.g., 0, 1, 2, or 3). In some embodiments, p and q are each 0.

In an embodiment, Z is a group derived from 4,4'-biphenol, Z' is a group derived from 6,6'-dihydroxy-3,3,3',3'-tetramethylspiro(bis)indane, and R is an m-phenylene group.

The polyetherimide comprises repeating units of formula (1) in an amount of at least 10 mole percent (mol %), or 10 to 100 mol %, or 20 to 100 mol %, or 20 to 80 mol %, or 50 to 80 mol %. In some embodiments, the molar ratio of Z to Z' is 10:90 to 100:0, preferably 30:70, more preferably 40:60 to 60:40. Thus, in some embodiments, the molar ratio of repeating units according to formula (1) to repeating units according to formula (2) can be 10:90 to 100:0, preferably 30:70, more preferably 40:60 to 60:40.

In an embodiment, the polymer composition comprises a polyetherimide comprising repeating units according to formulas (1) and (2) wherein Z is a group derived from 4,4'-biphenol, and the divalent bonds of the —O—Z—O— group are in the 3,3' position and the 4,4' position in a 2:1 to 1:2 molar ratio, or a 1:1 molar ratio; Z' is a group derived from 6,6'-dihydroxy-3,3,3',3'-tetramethylspiro(bis)indane, and the divalent bonds of the —O—Z'—O— group are in the 3,3' position and the 4,4' position in a 2:1 to 1:2 molar ratio, or in a 1:1 molar ratio; and the molar ratio of Z to Z' is 10:90 to 100:0, preferably 30:70 to 70:30, more preferably 40:60 to 60:40; and R is a meta-phenylene group.

The polymer composition can include less than 2 weight percent of cyclic oligomers, preferably less than 1.25 weight percent, more preferably less than 0.5 weight percent cyclic oligomers. In some embodiments, the cyclic oligomer can be of the formula (4A), (4B), or both,

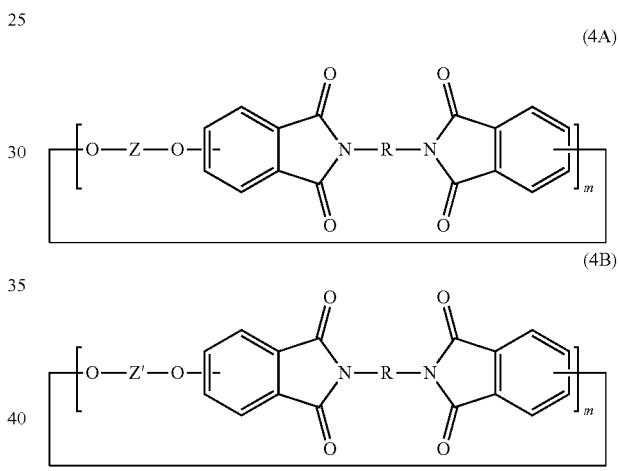

wherein Z, Z', and R are as described above. In some embodiments, each occurrence of m of the above formulas can independently be 1 to 10, for example 1 to 5, or 1 to 3, or 1 to 2. In some embodiments, m is preferably 1. In some embodiments, Z is a group derived from biphenol, Z' is a group derived from bisphenol A, 1,2-dihydroxybenzene, 1,1-bis(4-hydroxyphenyl)-1-phenyl-ethane, isophorone bisphenol (1,1-bis(4-hydroxyphenyl)-3,3,5-trimethylcyclohexane), spirobiindane bisphenol, dimethylindanone bisphenol, 3,3'-dimethylbisphenol cyclohexane, fluorenone bisphenol, or a combination comprising at least one of the foregoing, preferably a group derived from 6,6'-dihydroxy-3,3,3',3'-tetramethylspiro(bis)indane, and R is a m-phenylene group.

The polymer composition comprising the polyetherimide can have a combination of desirable properties. For example, the polyetherimide can have a glass transition temperature (Tg) of greater than 200° C., or 220 to 290° C., or 250 to 290° C. Glass transition temperature can be determined using differential scanning calorimetry according to ASTM D3148.

The polyetherimide of the polymer composition can have a weight average molecular weight of at least 20,000 grams per mole, preferably 20,000 to 100,000 grams per mole, more preferably 20,000 to 60,000 grams per mole. Weight average molecular weight can be determined by gel permeation chromatography, for example eluting with dichloromethane, and measured relative to polystyrene standards.

The polyetherimide of the polymer composition can have a maximum hydroxyl polymer endgroup content of 700 parts per million by weight. Hydroxyl endgroup content can be determined, for example, using proton nuclear magnetic resonance ($^1$H NMR) spectroscopy or infrared spectroscopy. The polyetherimide of the polymer composition can have less than 3000 part per million of a chloride, based on the total parts of polyetherimide. In some embodiments, the polymer composition has a maximum chloride content of 900 parts per million by weight, or less. Chloride content can be determined, for example, by analysis of an aqueous extract of the polymer using for example ion chromatography (IC).

The polymer composition can have an onset decomposition temperature of greater than 500° C., for example, 500 to 600° C., as determined using thermogravimetric analysis in air.

The polymer composition can have a water uptake of less than 1 percent, preferably less than 0.95 percent, more preferably less than 0.9 percent, even more preferably less than 0.7 percent. Water uptake can be determined as described in the working examples below.

The polymer composition can have a coefficient of thermal expansion of 30 to 60 ppm/° C., or 35 to 55 ppm/° C., or 39 to 50 ppm/° C., or 40 to 49 ppm/° C., as determined according to ASTM E 831.

The polymer composition can have a transparency of at least 82% at one or more of 850 nanometers, 1310 nanometers, and 1550 nanometers, as measured on a 1.2 millimeter thick molded part.

In some embodiments, the polyetherimide in molten form that has been exposed to a temperature of at least 380° C. for at least 5 minutes has a viscosity that is greater than or equal to 95% of the initial viscosity of the polyetherimide.

In some embodiments, the polyetherimide retains a melt stability that is at least 95% of the initial melt stability following exposure to a temperature of 400° C. for 30 minutes.

In addition to the polyetherimide described above, the polymer composition described herein can further include a polymer different from the polyetherimide. The polyetherimide can be present in an amount of 1 to 99 weight percent, based on the total weight of the polymer composition. Likewise, the polymer different from the polyetherimide can be present in an amount of 1 to 99 weight percent, based on the total weight of the polymer composition. The polymer different from the polyetherimide can be, for example, polyacetal, poly($C_{1-6}$ alkyl)acrylate, polyacrylamide, polyamide, polyamideimide, polyanhydride, polyarylate, polyarylene ether, polyarylene sulfide, polyarylsulfone, polybenzothiazole, polybenzoxazole, polycarbonate, polyester, polyetheretherketone, polyetherketoneketone, polyetherketone, polyethersulfone, poly($C_{1-6}$ alkyl)methacrylate, polymethacrylamide, polynorbornene, polyolefin, polyoxadiazole, polyoxymethylene, polyphthalide, polysilazane, polysiloxane, polystyrene, polysulfide, polysulfonamide, polysulfonate, polysulfone, polythioester, polytriazine, polyurea, polyurethane, polyvinyl alcohol, polyvinyl ester, polyvinyl ether, polyvinyl halide, polyvinyl ketone, polyvinyl thioether, a fluoropolymer (e.g., polyvinylidene fluoride, perfluoroalkoxy, polytetrafluoroethylene), or a combination comprising at least one of the foregoing. The polymer different from the polyetherimide can be, for example, a polyarylene ether (e.g., polyphenylene ether), polyaryletherketone (e.g., polyetherketone (PEK), polyetheretherketone (PEEK), polyetherketoneketone (PEKK), polyetheretherketoneketone (PEEKK), polyetherketoneetherketoneketone (PEKEKK), and the like), polyphenyl sulfone, polyester, polycarbonate, polyarylene sulfide, a fluoropolymer, polyamide, polyamideimide, polyethersulfone, or a combination comprising at least one of the foregoing. In some embodiments, the polymer composition excludes any polymer other than the polyetherimide. In some embodiments, the polymer composition comprises less than 1 weight percent, or less than 0.5 weight percent, or less than 0.1 weight percent of any polymer other than the polyetherimide. In some embodiments, the polymer composition consists essentially of the polyetherimide. In some embodiments, the polymer composition consists of the polyetherimide.

The polymer composition can further include one or more additives. The one or more additives can be selected to achieve a desired property, with the proviso that the additives are also selected so as to not significantly adversely affect a desired property of the polymer composition. The additive composition or individual additives can be mixed at a suitable time during the mixing of the components for forming the polymer composition. The one or more additives can include a particulate filler, antioxidant, heat stabilizer, light stabilizer, ultraviolet light stabilizer, UV absorbing additive, plasticizer, lubricant, release agent, antistatic agent, anti-fog agent, antimicrobial agent, colorant, surface effect additive, radiation stabilizer, flame retardant, anti-drip agent, or a combination comprising at least one of the foregoing. The additives are used in the amounts generally known to be effective. For example, the total amount of the additives (other than any impact modifier, filler, or reinforcing agent) can be 0.001 to 10.0 wt. %, or 0.01 to 5 wt. %, each based on the total weight of the polymer components in the thermoplastic composition. In an embodiment, the polymer composition further comprises a residual catalyst, impact modifier, filler, reinforcing agent, anti-oxidant, thermal stabilizer, light stabilizer, ultraviolet light absorber, quencher, plasticizer, lubricant, mold release agents antistatic agent, colorant, blowing agent, flame retardant, anti-drip agent, radiation stabilizer, or a combination comprising at least one of the foregoing. In some embodiments, the polymer composition is devoid of any additives, or the one or more additives are not intentionally added to the polymer composition.

The polymer composition can be prepared according to any method that is generally known. The polymer composition can be prepared by melt-mixing or a combination of dry-blending and melt-mixing. Melt-mixing can be performed in single or twin screw type extruders or similar mixing devices which can apply a shear and heat to the components. Melt-mixing can be performed at temperatures greater than or equal to the melting temperatures of the polymer components and less than the degradation temperatures of either of the polymer components. All of the ingredients can be added initially to the processing system. The ingredients can be added sequentially or through the use of one or more master batches. It can be advantageous to apply a vacuum to the melt through one or more vent ports in the extruder to remove volatile impurities in the composition. In some embodiments the composition is the product of melt-mixing the polymers and, when present, any additives.

The polyetherimide and the polymer composition can each independently be used in the preparation of various articles. The compositions of the present disclosure can be formed into articles using any suitable techniques, for examples, melt-processing techniques. Commonly used melt-molding methods can include injection molding, extrusion molding, blow molding, rotational molding, coining, and injection blow molding. For example, the melt molding method can be injection molding. The polyetherimide and the polymer composition can be formed into sheets and both cast and blown films by extrusion. These films and sheets can be further laminated, or thermoformed into articles and structures that can be oriented from the melt or at a later stage in the processing of the composition. The compositions can be over-molded onto an article made from a different material and/or by a different process. The articles can also be formed using techniques such as compression molding or ram extruding. The articles can be further formed into other shapes by machining. Exemplary articles can include an injection molded part, a film, a sheet, a multilayer sheet, a multilayer film, a multilayered laminate, a molded part, an extruded shape, a coated part, a pellet, a powder, a foam, a fiber, a flaked fiber, tubing, an extruded sheet, an extruded film, an extruded fiber, or an extruded stock shape. In particular, the article can be an optical lens, an infrared lens, an optical fiber connector, an electrical connector, an electronic connector, a light emitting diode (LED) reflector, a printed circuit board substrate, or a reflector for a headlamp (e.g., an automotive headlamp), a reflector for an electronic device, a heat sink for an LED device, a foamed aircraft panel, an automobile component, or an infrared transparent window or covering.

The polyetherimide of the polymer composition can be prepared by reacting an alkali metal salt of a dihydroxy aromatic compound of the formula (5) and (6)

with a bis(halo)phthalimide composition. M is an alkali metal. Alkali metal M can be any alkali metal, for example lithium, sodium, potassium, and cesium. Thus alkali metal salt is a lithium salt, sodium salt, potassium salt, cesium salt, or a combination comprising at least one of the foregoing. Specific alkali metals are potassium or sodium. In some embodiments, M is potassium. The alkali metal salt can be obtained by reaction of a metal hydroxide with aromatic $C_{6-24}$ monocyclic or polycyclic dihydroxy aromatic compound optionally substituted with 1 to 6 $C_{1-8}$ alkyl groups, 1 to 8 halogen atoms, or a combination thereof. Z is independently at each occurrence is a group derived from biphenol, and Z' is independently at each occurrence is a group derived from bisphenol A, 1,2-dihydroxybenzene, 1,1-bis(4-hydroxyphenyl)-1-phenyl-ethane, isophorone bisphenol (1,1-bis(4-hydroxyphenyl)-3,3,5-trimethylcyclohexane), spirobiindane bisphenol, dimethylindanone bisphenol, 3,3'-dimethylbisphenol cyclohexane, fluorenone bisphenol, preferably a group derived from spirobiindane (7), preferably (7-a). Preferably, the molar ratio of alkali metal salt of the dihydroxy aromatic compound to the bis(halophthalimide) composition is 0.9:1.0 to 1.0:0.9.

The bis(halo)phthalimide composition comprises, based on the weight of the bis(halo)phthalimide composition, at least 15 weight percent of a 3,3-bis(halophthalimide) of formula (7)

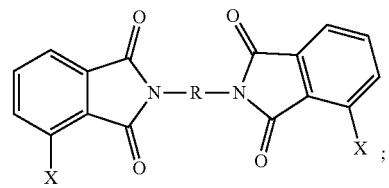

more than 47 to less than 85 wt. % of a 4,3'-bis(halophthalimide) of formula (8)

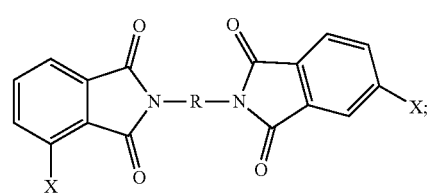

more than 0 to less than 27 wt. % of a 4,4'-bis(halophthalimide) of formula (9)

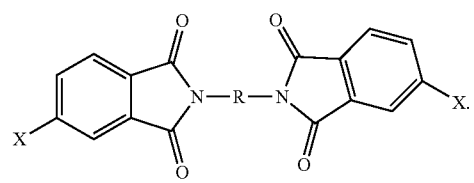

In the foregoing formulas, X is independently at each occurrence fluoro, chloro, bromo, iodo or nitro, and R is independently at each occurrence a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof.

The bis(halophthalimide) compositions can be prepared by contacting a substituted phthalic anhydride and an organic diamine. The substituted phthalic anhydride can be of formula (10)

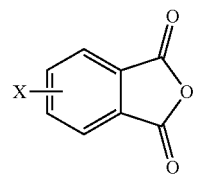

wherein X is a leaving group, as described above, for example a nitro group or a halogen. The organic diamine is of formula (11)

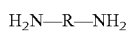

wherein R is as defined above. Exemplary diamines can include 1,4-diaminobutane, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis (p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, and bis(4-aminophenyl) ether. Poly($C_{1-4}$ alkylated) derivatives of the foregoing compounds can also be used, for example polymethylated 1,6-hexanediamine. Any regioisomer of the foregoing compounds can be used. Combinations of these compounds can also be used. In some embodiments, R is a meta-phenylene group.

The bis(halophthalimide) composition can be prepared at a temperature of least at 130° C., specifically 150° to 275° C., more specifically 160 to 250° C. Atmospheric or superatmospheric pressures can be used, for example up to 5 atmospheres, to facilitate the use of high temperatures without causing solvent to be lost by evaporation. The reaction of the substituted phthalic anhydride with the organic diamine to form bis(halophthalimide) can be conducted for 0.5 to 30 hours, specifically 1 to 20 hours, more specifically 1 to 10 hours, still more specifically 2 to 8 hours, and yet more specifically 3 to 7 hours.

The alkali metal salts of the dihydroxy aromatic compounds can be reacted with the bis(halophthalimide) composition under conditions effective to provide the polyetherimide. For example, the reacting to provide the polyetherimide can be at a temperature of at least 110° C., specifically 150° to 275° C., more specifically 160 to 250° C. Atmospheric or superatmospheric pressures can be used, for example up to 5 atmospheres, to facilitate the use of high temperatures without causing solvent to be lost by evaporation. The polymerization can be conducted for 0.5 to 30 hours, specifically 1 to 20 hours, more specifically 1 to 10 hours, still more specifically 2 to 8 hours, and yet more specifically 3 to 7 hours.

The reacting can be in the presence of a chain stopper (also referred to as an endcapping agent). The chain stopper limits molecular weight growth rate, and thus can be used to controls molecular weight in the polyetherimide. Exemplary chain stoppers can include certain mono amines (for example aniline), mono-phenolic compounds, and the like. In an embodiment, a suitable chain stopper is a monophenol or the corresponding alkali metal salt thereof. For example, the monophenol can be phenol, preferably sodium phenoxide, more preferably sodium para-cumyl phenol. Thus, when a monophenol is included as a chain stopper, the resulting polyetherimide comprises phenyl group as an end cap to the polymer chain. It should be understood however that the polyetherimides disclosed herein can be produced having any desired weight average molecular weight (Mw) with any end cap.

The reacting can be in the presence of a catalyst. A wide variety of catalysts can be used, for example, various phosphonium, ammonium, guanidinium, and pyridinium salts can be used.

The catalyst can be a hexa($C_{1-12}$ alkyl)guanidinium salt, a tetra($C_{1-12}$ alkyl)ammonium salt, a tetra($C_{1-12}$ alkyl) phosphonium salt, or a tetra($C_{6-20}$ aryl) phosphonium salt. For example, the catalyst can be tetraethylammonium bromide, tetraethylammonium acetate, tetrabutylammonium bromide, tetrapropylammonium bromide, tetrabutylammonium chloride, tetrabutylammonium fluoride, tetrabutylammonium acetate, tetrahexylammonium chloride, tetraheptylammonium chloride, Aliquat 336 phase transfer catalyst (methyltrioctylammonium chloride, manufactured by the General Mills Company), tetrabutylphosphonium bromide, tetraphenylphosphonium bromide, tetrabutylphosphonium chloride, hexaethylguanidinium chloride, and the like. A pyridinium salt, for example a bis-aminopyridinium salt can also be used.

The catalyst can be a quaternary salt or a bis-quaternary salt. Among the quaternary salts that can be used are catalysts of the formula $(R^3)_4Q^+X$, wherein each $R^3$ is the same or different, and is a $C_{1-10}$ alkyl; Q is a nitrogen or phosphorus atom; and X is a halogen atom or a $C_{1-8}$ alkoxy or $C_{6-18}$ aryloxy. Exemplary catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, $CH_3(CH_3(CH_2)_3)_3NX$, and $CH_3(CH_3(CH_2)_2)_3NX$, wherein X is Cl$^-$, Br$^-$, a $C_{1-8}$ alkoxy or a $C_{6-18}$ aryloxy.

Among the bis-quaternary salts that can be used are those of the formula $(R^4)_kQ^+(R^3)_m{}^+Q(R^4)_k(X^2)_2$ wherein each $R^3$ is independently a divalent $C_{1-60}$ hydrocarbon group, all $R^3$ taken together contain 4-54 carbon atoms, each $R^4$ is independently a $C_{1-12}$ hydrocarbon group, Q is nitrogen or phosphorus, preferably nitrogen, $X^2$ is an anion-forming atom or group, k is an integer from 1 to 3, and m is 4-k, wherein at least three of $R^3$ and $R^4$ groups attached to each Q atom are aliphatic or alicyclic. In particular, each $R^3$ can be a divalent $C_{1-18}$ alkylene, $C_{3-8}$ cycloalkylene, or $C_{6-18}$ aromatic group such as ethylene, propylene, trimethylene, tetramethylene, hexamethylene, octamethylene, decamethylene, dodecamethylene, cyclohexylene, phenylene, tolylene, or naphthylene, or a $C_{3-12}$ divalent heterocyclic group derived from a compound such as pyridine or indole. In some embodiments, each $R^3$ is $C_{1-12}$ alkylene, specifically $C_{3-8}$ alkylene. Preferably, only one $R^3$ group is present (i.e., m is 1 and each k is 3) and it contains 5-10, specifically 6 carbon atoms. Illustrative $R^4$ groups are methyl, ethyl, n-propyl, isopropyl, n-butyl, isobutyl, n-hexyl, n-heptyl, cyclopentyl, cyclohexyl, methylcyclohexyl, phenyl, tolyl, 2-(1,4-dioxanyl) and 2-furyl. Preferably, the $R^4$ groups are all alkyl, for example $C_{1-4}$ n-alkyl groups. The $X^2$ can be any anion that is stable under the conditions used; suitable anions include chloride, bromide, sulfate, p-toluenesulfonate, and methanesulfonate, preferably bromide. The value of the integer k can be from 1 to 3, and the value of m is 4-k. In some embodiments, each k is 3 and m is 1. In the some embodiments, all of the $R^3$ and $R^4$ groups are aliphatic. Illustrative bis-quaternary salts of this type include those in which $R^3$ is a polymethylene chain from trimethylene to dodecamethylene, each $R^4$ is either n-butyl or n-hexyl, Q is nitrogen, $X^2$ is bromide, each k is 2 and m is 2; the compound in which each $R^3$ is ethylene, $R^4$ is n-butyl, Q is nitrogen, $X^2$ is bromide, each k is 1 and m is 3; and the compound in which $R^3$ is hexamethylene, each $R^4$ is n-butyl, Q is phosphorus, $X^2$ is bromide, each k is 3 and m is 1.

The catalyst is preferably a quaternary ammonium salt, guanidinium salt, pyridinium salt, imidazolium salt, or a combination comprising at least one of the foregoing, more preferably wherein the catalyst is a hexaalkylguanidinium salt, even more preferably wherein the catalyst is hexaethylguanidinium chloride.

During the reacting, the catalyst can be present in an amount of 0.1 to 10 mole percent (mol %), preferably 1 to 10 mol %, more preferably 0.5 to 2.0 mol %, based on the total moles of the dialkali metal salt of the dihydroxy aromatic compound. In some embodiments, the polymer composition comprising the polyetherimide prepare according to the above-described method includes less than 1000 parts per million (ppm) by weight of a residual catalyst, based on the weight of the polyetherimide.

In another embodiment, the polyetherimide can be prepared by reacting an aromatic bis(ether phthalic anhydride) of formula (12) and (13)

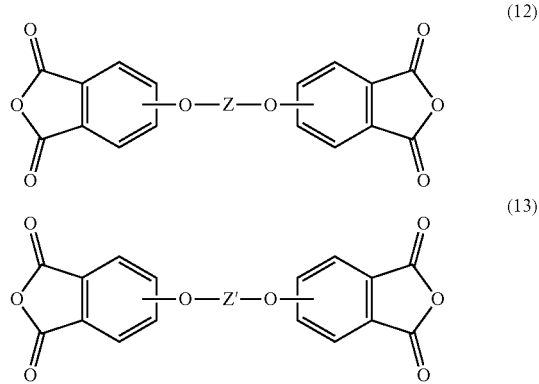

with an aromatic diamine of formula (11)

$$H_2N-R-NH_2 \quad (11)$$

to provide the polyetherimide, wherein Z, Z', and R of the foregoing formulas are as described above. In some embodiments, R is a meta-phenylene group.

The reacting of the aromatic bis(ether phthalic anhydride) with the organic diamine can be under conditions effective to provide the polyetherimide. For example, the reacting can be in the presence of a solvent, for example, N-methylpyrrolidone, N-ethylpyrrolidone, dimethylacetamide, dimethylformamide, cresol, sulfolane, diphenylene sulfone, dimethyl sulfone, diphenyl ether, N-methyl-caprolactam, tetramethyl urea, 1,2-dimethyl-2-imidazolidinone, veratrole, phenetole, dimethylsulfoxide, trichloromethane, acetone, methanol, ethanol, toluene, benzene, chlorobenzene, bromobenzene, dichlorobenzenes, trichlorobenzenes (e.g., 1,2,4-trichlorobenzene), xylene (including m-xylene, o-xylene, p-xylene, and combinations comprising at least one of the foregoing), anisole, ethylbenzene, propylbenzene, mesitylene, and the like, or a combination comprising at least one of the foregoing. Sufficient solvent is generally utilized to provide a solids content of 1 to 90%, or 10 to 90%, or 10 to 80%, or 15 to 60%.

The reacting of the aromatic bis(ether phthalic anhydride) with the organic diamine can be in the presence of a chain stopper (also referred to as an endcapping agent). The chain stopper limits molecular weight growth rate, and thus can be used to control molecular weight in the polyetherimide. Exemplary chain stoppers include certain monoamines (for example aniline), monoanhydrides (for example phthalic anhydride), and the like. In an embodiment, a suitable chain stopper is phthalic anhydride. Thus, when phthalic anhydride is included as a chain stopper, the resulting polyetherimide comprises phthalimide as an end cap to the polymer chain. It should be understood however that the polyetherimides disclosed herein can be produced having any desired weight average molecular weight (Mw) with any end cap.

The reacting of the aromatic bis(ether phthalic anhydride) with the organic diamine can be at a temperature of 100 to 250° C., or 120 to 230° C., or 150 to 210° C., or 150 to 250° C., and can be carried out for 0.5 to 10 hours, preferably with agitation (e.g., stirring). To avoid deleterious oxidation reactions, the contacting of the aromatic bis(ether phthalic anhydride) with the organic diamine can be blanketed under an inert gas. Examples of such gases are dry nitrogen, helium, argon and the like. Dry nitrogen can be preferred. The reaction can be run at atmospheric to superatmospheric pressure The compositions, methods, and articles are further illustrated by the following non-limiting examples.

EXAMPLES

Materials for the following examples are listed in Table 1.

TABLE 1

| Component | Description | Source |
|---|---|---|
| 3,3'-BPADA | 3,3'-Bisphenol A dianhydride | SABIC |
| 4,4'-BPADA | 4,4'-Bisphenol A dianhydride | SABIC |
| 3,3'-BPoDA | 3,3'-Biphenol dianhydride | SABIC |
| 4,4'-BPoDA | 4,4'-Biphenol dianhydride | SABIC |
| 3,3'-SBIDA | 3,3'-Spirobiindane bisphenol dianhydride | SABIC |
| 4,4'-SBIDA | 4,4'-Spirobiindane bisphenol dianhydride | SABIC |
| 3,3'-CDA | 3,3'-Catechol dianhydride | SABIC |
| 4,4'-CDA | 4,4'-Catechol dianhydride | SABIC |
| 3,3'-BPIDA | 3,3'-Isophorone bisphenol dianhydride | SABIC |
| 3,3'-FDA | 3,3'-Bisphenol fluorenone dianhydride | SABIC |
| 4,4'-FDA | 4,4'-Bisphenol fluorenone dianhydride | SABIC |
| BPI | Isophorone bisphenol | SABIC |
| Catechol | 1,2-Dihydroxybenzene | Fisher Scientific |
| BP | 4,4'-Biphenol | Melog |
| SBI | 1,1,1',1'-Tetramethyl-5,5'-dihydroxy-3,3'-spirobiindane | SABIC |
| BPFL | 9,9-Bis(4-hydroxyphenyl)fluorene | Sigma Aldrich |
| 3-FPA | 3-Fluorophthalic anhydride | Fisher Scientific |
| 4-FPA | 4-Fluorophthalic anhydride | AmplaChem |
| 3-ClPA | 3-Chlorophthalic anhydride | SABIC |
| 4-ClPA | 4-Chlorophthalic anhydride | SABIC |

TABLE 1-continued

| Component | Description | Source |
|---|---|---|
| KF | Potassium fluoride | Fisher Scientific |
| Ac$_2$O | Acetic anhydride | Fisher Scientific |
| AcOH | Acetic acid | Fisher Scientific |
| mPD | meta-Phenylene Diamine | Fisher Scientific |
| DMAc | N,N'-Dimethyl Acetamide | Fisher Scientific |
| oDCB | Ortho-dichlorobenzene | Fisher Scientific |
| HEGCl | Hexaethylguanidinium chloride | SABIC |
| H3PO4 | Phosphoric acid | Fisher Scientific |
| PCP | Para-cumyl phenol | Fisher Scientific |
| PEI | Polyetherimide made from the reaction of bisphenol A dianhydride with meta-phenylene diamine, having a glass transition temperature of 217° C., available as ULTEM 1010 | SABIC |
| PEI-S1 | Polyetherimide made from the reaction of a 3,3'-bis(halophthalimide) with an alkali salt of bisphenol A, having a glass transition temperature of 267° C., available as EXTEM XH1015 | SABIC |

Representative Example of Dianhydride Synthesis

To an oven dried, 3-necked, 500 mL round-bottomed flask equipped with a football shaped magnetic stir bar was added 10.0 grams of 4,4-biphenol (0.0537 mol), 15.598 grams of potassium fluoride (anhydrous) (0.2685 mol) and 19.624 grams of 3-fluorophthalic anhydride (0.1181 mol), and 200 mL of DMAc (anhydrous), under inert atmosphere of nitrogen. Attention was paid to washing the contents of funnel down into the flask. The flask was capped with septa and transferred to hood. The flask was then fitted with a nitrogen adapter, and condenser, and was purged with nitrogen for few minutes to sufficiently blanket the flask with N$_2$. The flask was submerged in an oil bath, and the oil bath temperature was raised to 170° C. and the reaction was then refluxed for 2.5-3 hours, then cooled to room temperature. The reaction progress was monitored by thin layer chromatography (TLC) (30:70 EtOAc/Hex). Once the reaction reached completion, the reaction mixture was cooled to room temperature and added slowly to 600 mL of refrigerated deionized water in a 1 liter beaker under rigorous stirring to form finely divided. The mixture was filtered through a pleated, paper filter to collect the precipitate and washed with an additional 100 mL of room temperature deionized water. The solids were transferred to a 250 mL beaker and placed in a vacuum oven for drying. The material is dried overnight at a reduced pressure of 20 torr at 120° C. to obtain 25.69 grams of a crude dianhydride material. Resulting crude dianhydride material was added to a 3-necked, 250 mL, round-bottomed flask equipped with a magnetic stir bar, nitrogen adapter, and condenser, and 175 mL of 50/50 (v/v) Ac$_2$O/AcOH. The mixture was stirred well and heated to 150° C. and maintained at this temperature for 2-3 hours. The contents of the flask was then transferred to a 500 mL beaker and allowed to cool for form a light brown colored precipitate in the following morning. The precipitate was separated from the mother liquor by vacuum filtration using a medium glass sintered filter (20-25 am). The filtrate was washed with 50:50 Ac$_2$O/AcOH to remove traces of impurities. The material was air-dried for 1-2 hours in fume hood. The collected material was dried overnight in a vacuum oven at 110° C. at 20 Torr. The pure product was collected in 73% yield after the material was heated in an aluminum pan at 280-285° C. (yield: 18.75 grams, mp: 281-282° C.).

General Procedure for Solvent Casting of Polymer Films:

The "amic-acid" procedure was used to make the desired polymer. 1 molar equivalent of bisether dianhydride in 3.73-7.45 mL of anhydrous DMAc was added to a 20 mL scintillation vial. The material was weighed under inert atmosphere (inside glove box). The vial is then placed in a sonicator bath for about 15 minutes to effect dissolution. An equivalent molar amount of diamine (1:1 stoichiometry of diamine to dianhydride, no chain stopper) was then added to the vial. The theoretical mass of expected polymer (0.5-1.0 gram) was used to calculate 12.5 wt % solids in DMAc. The vial containing the monomers and DMAc was purged with nitrogen gas prior to attachment of cap, and sonicated with no heat for another 20 minutes to effect dissolution. The vial was then placed on a flat-bed shaker and was left to agitate for 14-16 hours (overnight) affording a viscous polyamic acid (clear to light brown in color) solution.

At room temperature, 2 mL of amic-acid solution was drawn in to a 3 mL syringe. The solution was then filtered through a 0.45 μm PTFE syringe filter and applied on to a cleaned glass slide located on the aluminum sheet of film developer. The aluminum riser having Gortex spacer was placed on the aluminum plate and the quartz cover was set so that small gaps appeared at the top of the angled riser allowing for vapor to escape. The chamber was purged with nitrogen gas for 20 minutes prior to the initiation of thermal curing.

Thermal curing was carried out using a DigiTrol II temperature controller. The temperature profile for the thermal curing process is provided in Table 2. The temperature profile was set up to start at room temperature (25° C.) and slowly ramp up the temperature to 375° C. The heat was turned off once 375° C. was reached. The resulting film was cooled to room temperature and then immersed in room temperature DI water for 10-12 hours to remove the cured film from the glass slide.

TABLE 2

| | Temp. (° C.) | | | | | | | | | |
|---|---|---|---|---|---|---|---|---|---|---|
| | 25 | 40 | 40 | 120 | 120 | 160 | 160 | 200 | 200 | 375 |
| Time (min) | 0 | 45 (ramp) | 15 (soak) | 30 (ramp) | 30 (soak) | 30 (ramp) | 15 (soak) | 15 (ramp) | 15 (soak) | 30 (ramp) |

Representative Solvent Casting Procedure

A polyetherimide polymer (1 gram) comprising repeat units derived from 3,3'-BPoDA (0.3574 g, 0.7470 mmol), 4,4'-BPoDA (0.3574 g, 0.7470 mmol), 3,3'-SBIDA (0.0791 g, 0.1317 mmol), 4,4'-SBIDA (0.0791 g, 0.1317 mmol), and mPD (0.1901 g, 1.7579 mmol) was added to 7.47 mL of anhydrous DMAc. The dianhydride component of the copolymer comprised 42.5 mole percent of each 3,3'-BPoDA, and 4,4'-BPoDA, 7.5 mole percent of each 3,3'-SBIDA, and 4,4'-SBIDA. The diamine component of the copolymer comprised 100 mole percent of mPD. The polyetherimide solution was mixed for 16 hours on a flat-bed shaker, and a viscous dark brown solution was obtained. Thermal curing of this solution resulted in a medium brown-colored, highly creasable film.

The polymer samples of examples 1-26 were prepared from the bisphenol monomers by first preparing the corresponding dianhydrides, and polymerizing with a commercially available diamine, meta-phenylene diamine (mPD) using solvent casting method. The polymers prepared by this process are summarized in Table 3 as examples 1-26. For polymers including more than one dianhydride, the molar ratio of the dianhydrides used is shown in parenthesis following the monomers.

The molecular weight of polymers were determined using gel permeation chromatography (GPC) analysis with a Water 2695 Separations Module equipped with a Polymer Labs Plgel 5 µm MIXED-column and water 2487 PDE detector at 254 nm. Elution was effected with isocratic solvent system of dichloromethane at 1 mL/min and Mw is reported relative to polystyrene standards obtained from Polymer Labs. Each sample was run for 15 min with an injection volume of 5 µm. The peak from oDCB was used as a reference peak. The molecular weights were measured as described in ASTM method D5296.

Differential Scanning Calorimetry was used to determine glass transition temperature (Tg) per ASTM test D3418. In a typical procedure, a polymer sample (10-20 mg) was heated from 40° C. to 300° C. (20° C./min), held at 300° C. for 1 min, cooled back to 40° C. (20° C./min), then held at 40° C. for 1 min, and the above heating/cooling cycle was repeated. The second heating cycle is usually used to obtain the Tg.

Thermal Gravimetric Analysis (TGA) measurements were performed with a TA Q800 TGA. The samples were scanned from 40° C. to 800° C. under nitrogen and Air with a heating rate of 20° C./min. This analysis was also used to determine the temperature of peak decomposition (also referred as the onset decomposition temperature).

The coefficient of thermal expansion (CTE) was analyzed to assess the dimensional stability of the polymers. The CTE of the films were measured after annealing the films at 150° C. for about 12 hours. The CTE was measured using a thermo-mechanical analysis (TMA) instrument with a temperature range of 50° C. to 170° C., and calculated using the slope of a linear fit to the TMA curve between 50° C. and 170° C. The CTE were measured on films produced according to ASTM E 831.

The water uptake of the polymers was determined by using the following procedure: Samples of the cured polymer films were cut to a size of at least 2 centimeters×2 centimeters and weighed. The weight was recorded as M1. The samples were dried in a vacuum oven at 120° C. for 24 hours. Following cooling to room temperature under vacuum, the samples were quickly weighed (recorded as M2) and immersed in DI water for 24 hours. The samples were removed from the water, wiped dry, and weighed again (recorded as M3). The water absorption was calculated using the formula: Water absorption (%)=(M3−M2)*100/M2.

The percent transmission of the polymer disc was measured using Perkin Elmer LAMBDA 950 across the 400 nm (UV) to 1600 nm (NIR) range. The discs used for measurement had thickness of 1.12-1.20 mm.

The viscosity data was measured on polymer grinds using Capillary Rheometry, at 380° C. The frequency sweep comparison at frequencies (25 rad/sec to 7000 rad/sec) as well as the viscosity decrease (apparent viscosity decrease) over injection molding shear rates was determined. The ratio of viscosities at 25 rad/s to 5000 rad/sec was measured at a 380° C. This viscosity ratio gives a measure of shear thinning or improved flow properties. The higher the viscosity ratio, the higher the shear thinning and hence improved flow.

The oscillatory time sweeps measurement was used to determine the thermal stability of a material (monitoring the change in viscosity or modulus of a material as a function of time) at a constant temperature. Oscillatory measurements were performed using a parallel-plate geometry with a fixed gap of 1 mm using an ARES Strain Controlled Rheometer Manufactured by TA Instruments. The test frequency was fixed at 10 rad/s.

As shown in Table 3, polymers prepared containing the 3- or 4-isomers of bisphenol dianhydrides and meta-phenylene diamine (examples 1-3) yielded polymeric material having glass transition temperatures of 265 to 268° C.

To improve the processability of the biphenol-based polymers, a set of random polyetherimide copolymers were prepared by including 20-30% of other bisphenol-containing dianhydrides including spirobiindane bisphenol dianhydride (SBIDA), bisphenol A dianhydride (BPADA), 1,2-dihydroxybenzene dianhydride (CDA), isophorone bisphenol dianhydride (BPIDA), and fluorenone bisphenol dianhydride (FDA). Each of the copolyetherimides of examples 4-20 showed high heat capability with a glass transition temperature greater than 200° C. Good thermal stability was also demonstrated by less than a 1 weight percent loss by TGA below 469° C. in both air and nitrogen atmospheres. The polymers possessed good dimensional stability with CTE values of 40 to 49 ppm/° C. Additionally, the copolyetherimides of examples 4 to 20 all showed low moisture absorption of 1% or less. The polymers of examples 13 and 14 formed highly brittle films, and no property measurements were taken.

Several polymer compositions were evaluated comprising repeat units derived from biphenol dianhydride and a spirobiindane bisphenol dianhydride due to its ease of manufacturing and processability, specifically compositions including both 3,3'- and 4,4'-BPoDA and 3,3'- and 4,4'-SBIDA (examples 6, 15-20). The Tg of the resulting polymers was observed to increase with the amount of 4,4'-BPoDA, as shown in FIG. 1. Polymers having a composition including BPoDA:SBIDA in a ratio of 40:60 to 60:40 were found to provide polymers with further enhanced heat performance, ductility, and improved processability (examples 16-17).

TABLE 3

| Ex. | Polymer Composition | Tg (° C.) | Onset Decomposition Temperature (° C.) | | CTE (ppm/° C.) | Water absorption (%) |
|---|---|---|---|---|---|---|
| | | | Air | Nitrogen | | |
| 1 | 3,3'-BPoDA-mPD | 268 | 581.4 | 511.05 | 42.8 | 0.73 |
| 2 | 4,4'-BPoDA-mPD | 268 | 582.64 | 534.01 | 43.73 | 0.64 |
| 3 | 3,3'-BPoDA/4,4'-BPoDA (50/50)-mPD | 265 | 587.83 | 518.4 | 42.59 | 0.88 |
| 4 | 3,3'-BPoDA/3,3'-CDA (80/20)-mPD | 255 | 571.91 | 493.76 | 43.28 | 0.74 |
| 5 | 4,4'-BPoDA/3,3'-CDA (80/20)-mPD | 220 | 583.64 | 567.3 | 42.04 | 1.04 |
| 6 | 3,3'-BPoDA/3,3'-SBIDA (80/20)-mPD | 259 | 556.31 | 486.19 | 44.72 | 0.6 |
| 7 | 3,3'-BPoDA/3,3'-BAPDA (80/20)-mPD | 254 | 567.98 | 493.5 | 41.75 | 0.8 |
| 8 | 3,3'-BPoDA/4,4'-BPADA (80/20)-mPD | 254 | 546.82 | 500.41 | 43.35 | 0.66 |
| 9 | 3,3'-BPoDA/4,4'-BPADA (70/30)-mPD | 248 | 550.27 | 497.83 | 43.37 | 0.95 |
| 10 | 4,4'-BPoDA/4,4'-BPADA (80/20)-mPD | 244 | 569.07 | 524.5 | 43.51 | 0.88 |
| 11 | 4,4'-BPoDA/4,4'-BPADA (70/30)-mPD | 234 | 551.7 | 497.69 | 47.45 | 1 |
| 12 | 3,3'-BPoDA/3,3'-BPIDA (80/20)-mPD | 253 | 569.64 | 469.79 | 43.44 | 0.88 |
| 13 | 3,3'-BPoDA/4,4'-FDA (70/30)-mPD | 258 | 562.11 | 504.88 | — | — |
| 14 | 3,3'-BPoDA/3,3'-FDA (70/30)-mPD | 262 | 577.99 | 479.91 | — | — |
| 15 | 3,3'-BPoDA/4,4'-BPoDA/3,3'-SBIDA/4,4'-SBIDA (10/10/40/40)-mPD | 262 | 512.9 | 500.82 | 44.55 | 0.58 |
| 16 | 3,3'-BPoDA/4,4'-BPoDA/3,3'-SBIDA/4,4'-SBIDA (20/20/30/30)-mPD | 262 | 507.57 | 504.2 | 44.09 | 0.9 |
| 17 | 3,3'-BPoDA/4,4'-BPoDA/3,3'-SBIDA/4,4'-SBIDA (25/25/25/25)-mPD | 262 | 509.7 | 504.75 | 41.96 | 0.87 |
| 18 | 3,3'-BPoDA/4,4'-BPoDA/3,3'-SBIDA/4,4'-SBIDA (40/40/10/10)-mPD | 282 | 552.96 | 503.65 | 49.63 | 0.94 |
| 19 | 3,3'-BPoDA/4,4'-BPoDA/3,3'-SBIDA/4,4'-SBIDA (42.5/42.5/7.5/7.5)-mPD | 282 | 552.53 | 500.84 | 40.89 | 0.98 |
| 20 | 3,3'-BPoDA/4,4'-BPoDA/3,3'-SBIDA/4,4'-SBIDA (45/45/5/5)-mPD | 280 | 555.12 | 495.16 | 42.33 | 0.7 |

Based on the results summarized above, 4,4'-biphenol and spirobiindane bisphenol monomers were further examined for their suitability for the preparation of a polyetherimide using a chloro-displacement polymerization process. In general, a mixture of the 3- and 4-isomers of ClPAMI was reacted with the disodium salts of 4,4'-biphenol and spirobiindane bisphenol in the presence of a phase transfer catalyst (HEGCl) at 200° C. in oDCB, as shown in the chemical scheme below.

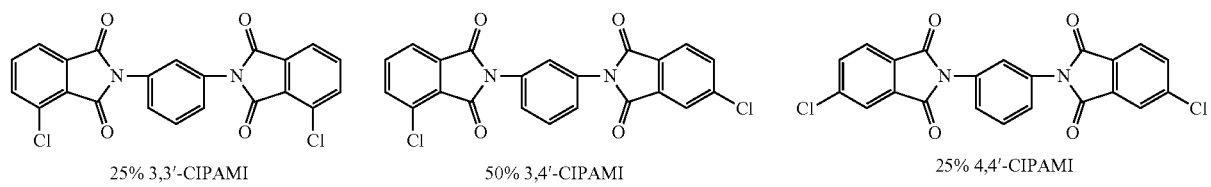

25% 3,3'-ClPAMI    50% 3,4'-ClPAMI    25% 4,4'-ClPAMI

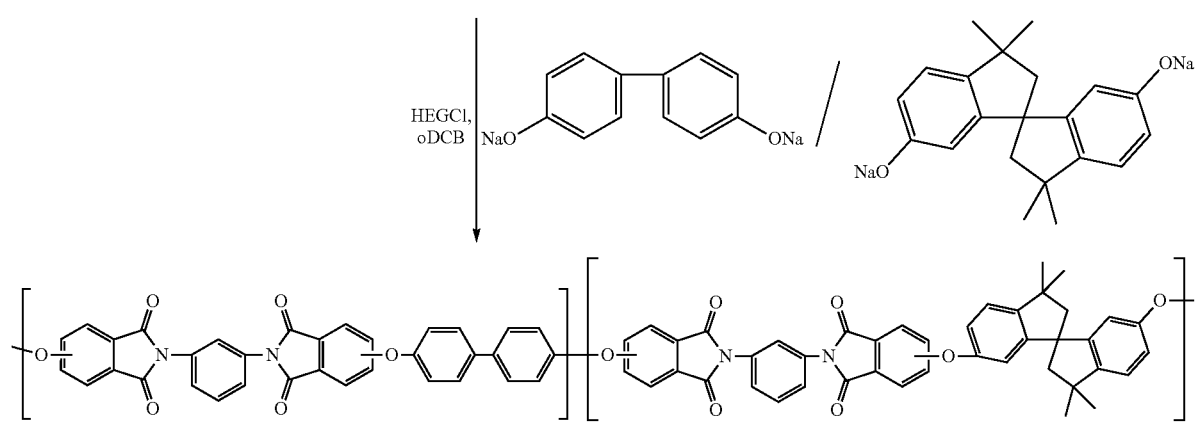

Experimental details for polymers prepared by this process are provided below.

Preparation of ClPAMI by In Situ Imidization

A 500-mL, three-necked flask equipped with a stopper and a gas valve were charged with 4.8960 grams (0.04574 moles) of mPD, 8.350 grams (0.04574 moles) 4-ClPA, 8.350 grams (0.04574 moles) of 3-ClPA, 0.012 grams (0.04574 mmoles) of HEGCl, and 90 grams of oDCB. The flask was then equipped with a stir shaft and bearing, nitrogen adapter, and a Dean Stark trap receiver topped with a reflux condenser. A gentle sweep of nitrogen was established through the head-space of the vessel. The stirring is initially done at 100 rpm to prevent splattering. The reaction was heated to 100° C., and then ramped slowly to 200° C. The temperature ramp was to 150° C., 180° C., and 200° C. The stirring speed was increased to 300 rpms. It should be noted that the random mixture of 3- and 4-ClPA generates a mixture of 3,3'-chlorophthalimide (ClPAMI), 3,4-ClPAMI, and 4,4'-ClPAMI in a 1:2:1 ratio.

The oDCB was removed from the reaction mixture until reaching 22-25 weight percent solids. An accurate record of the amount of oDCB removed is kept, and it is preferred to use a low nitrogen flow to ensure that oDCB is not lost through the condenser during removal. After 2 to 3 hours, a 30 milligram (mg) sample was taken in 20 mL of acetonitrile, and sonicated for 15 minutes. The solution was filtered, and analyzed by UPLC for the presence of monoamine, 3- and 4-ClPA, and mPD. The UPLC method is designed to report milligrams of analyte per grams of oDCB, thus an accurate account of all the oDCB is very important. Once the amounts of analytes are known, appropriate correction is made with either mPD or ClPA. This is repeated until the 3-monoamine, 4-monoamine, 3-ClPA and 4-ClPA is within the acceptable range. The reaction mixture is then cooled while maintained under inert nitrogen atmosphere.

Preparation of Bisphenol Disodium Salt

A 1-liter, three neck round-bottomed flask with a stir bar was charged with 0.5 moles of bisphenol (4,4'-biphenol or 6,6'-dihydroxy-3,3,3',3'-tetramethylspiro(bis)indane) and 1000 ppm of $Na_2SO_4$ followed by 400 mL of degassed deionized (DI) water. A stoichiometric amount of 1.0 N NaOH was added to the mixture. Caution was taken to maintain the system under an inert nitrogen atmosphere during addition of the NaOH.

The stirring reaction mixture was heated to 65° C. and 90° C. for methanol-water and water-based reactions, respectively, using a temperature controlled external oil bath. The reaction of the bisphenol component with the NaOH provides a solution of bisphenol disodium salt.

A 2-liter, three neck round-bottomed flask, equipped with a Dean-Stark receiver topped with a water cooled or glycol cooled reflux condenser, a mechanical stirrer, and means for maintaining a nitrogen atmosphere, was charged with one liter of degassed, reagent-grade oDCB which was obtained by sparging nitrogen into the liquid for 15 minutes. The oDCB was heated to 120 or 160° C. for the methanol-water or water-based solutions, respectively. The bisphenol disodium salt obtained above was added to the flask using a peristaltic pump. The bisphenol disodium salt solution was added at a rate at which the azeotrope distills from the reactor in a controlled manner (about 4 milliliters per minute).

The water (or methanol/water) was continuously removed from the collection arm of the receiver as the salt solution was pumped into the reactor. Heating of the salt was continued until a sample of oDCB collected from the distillate showed a water concentration of less than 200 parts per million (ppm), most preferably less than 50 ppm. The resulting bisphenol salt solution in oDCB was maintained under an inert nitrogen atmosphere.

Polymerization Procedure

In a dry box, a 250-mL, three neck round-bottom flask equipped with a stopper and a gas valve were charged with 6.362 grams (0.01806 moles) of the disodium salt of 6,6'-dihydroxy-3,3,3',3'-tetramethylspiro(bis)indane, 5.483 grams (0.02539 moles) of 4,4'-biphenol, and 20 grams (0.04574 moles) ClPAMI. The flask was charged with 130 grams of oDCB. The flask was then equipped with a stir shaft and bearing. The flask was removed from the dry-box and immediately fitted with a nitrogen adapter on a side neck. The remaining stopper was allowed to float, venting any pressure. The flask was then fitted with a Dean-Stark receiver topped with a reflux condenser. The nitrogen was allowed to flow from the top of the condenser to a bubbler filled with silicone oil. A gentle sweep of nitrogen was established through the head-space of the vessel. The reaction mixture was heated to 200° C. with a nitrogen sweep, to remove a portion of the oDCB (about 35 grams). oDCB was removed from the mixture until the mixture reached 25 weight percent solids. The mixture was stirred gently to avoid splattering of the materials on the sides of the flask or up on the stir shaft. Karl Fischer analysis was used to determine the point at which the overheads were dry, then 120 mg (1 mole percent) of the phase transfer catalyst hexaethylguanidinium chloride (HEGCl) was added to the stirring reaction mixture. Within 30 minutes, the solution was observed to have a brownish color, and finally a golden color after 90 minutes. Molecular weight analysis was performed on a sample removed from the reaction mixture after 2 hours, and was repeated every hour until the molecular weight plateaued. A molecular weight "plateau" as used herein refers to 3 consecutive samples having a molecular weight within 300 daltons. Further salt corrections were made to achieve a weight average molecular weight (Mw) of 45-60 kilodaltons (kDa).

The reaction was quenched with 275 mg (1 weight percent with respect to total weight of polymer) of concentrated phosphoric acid ($H_3PO_4$). Following the addition of acid, any traces of water were removed by a nitrogen purge (5 minutes). The reaction mixture was heated for one hour, followed by cooling and diluting to 8 weight percent with oDCB. The mixture was then filtered using a Buchner funnel with a Whatman 1 μm glass filter disk at 150° C. The golden solution was transferred to 1-liter separatory funnel with equal volume of acidic water and vigorously shaken. The organic phase containing the polymer was separated and transferred to a 500 mL round bottom flask and concentrated to provide a solution having a solids content of 25-30 weight percent. The solution was then diluted with dichloromethane, and the polymer was precipitated by mixing with equal volume of hexane using a blender. The polymer was isolated by filtration and dried under vacuum at 165° C. for 24 hours.

Similar processes were used to make the polyetherimide of Ex. 24, using the components in the amounts shown in Table 4. The resulting polyetherimides (Ex. 21 and Ex. 24) were found to have high molecular weight (e.g., greater than 43,000 Da). Spiro(bis)indane based polymers are known to form principally macrocyclic polyetherimides dimers. It was found that the polyetherimides of Ex. 21 and Ex. 24 had a very low content of residual cyclic oligomers (less than 1.30 weight percent) (Table 4). The polyetherimides of Ex. 21 and Ex. 24 were further found to have a high Tg (greater than 258° C.) and onset decomposition temperature (greater than 508° C.), excellent dimensional stability (<45 ppm/°

C.), and good water uptake (less than 1 wt %). The polymers exhibited lower water uptake and improved onset decomposition temperatures when compared with comparative Ex. 23 (Table 4).

Figure 2:
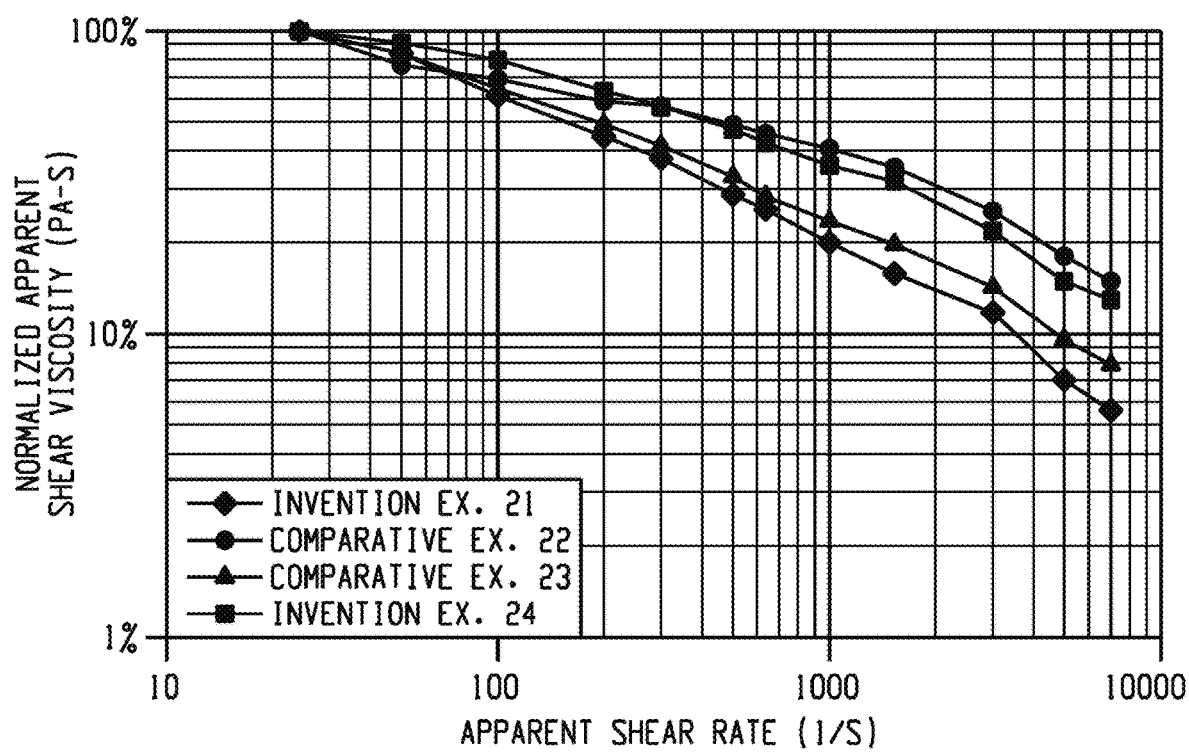
FIG. 2 shows viscosity as a function of shear rate for examples 21-23.

The polyetherimides prepared by the above-described process were subjected to capillary rheology analysis, and the results were analyzed against comparative examples 22 ("PEI" of Table 1) and 23 ("PEI-S 1" of Table 1). The results revealed that the Ex. 21 polyetherimide had an improved flow (shear thinning) compared to the Ex. 22 and Ex. 23. Without wishing to be bound by theory, this is believed to be primarily due to the combined effect of leveraging 3-ClPA and sterically hindered spirobiindane bisphenol concentration, thereby creating increased free volume in the polymer backbone. The Ex. 21 polyetherimide showed at least a 30-40% reduction in viscosity at high shear rate (7000/s), as shown in FIG. 2. Also, the rheology ratios (indicator of flow) showed higher rheology ratio for Ex. 21 compared to Ex. 22 and Ex. 23 (Table 4). The improved melt-flow properties would allow for the design of complicated thin-wall geometries.

Figure 3:
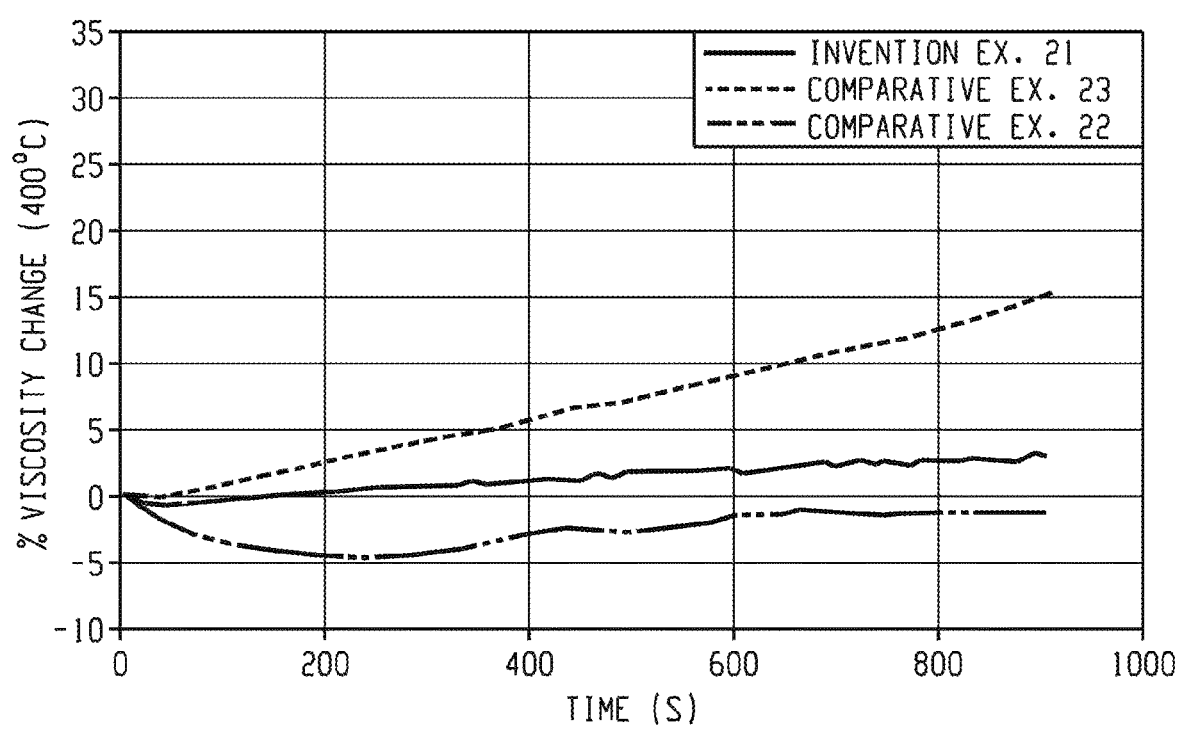
FIG. 3 shows the change in viscosity (%) over time for examples 21-23.

A time sweep study was also performed to evaluate the melt stability of Ex. 21 and the results were compared with Ex. 22 and Ex. 23. The test sample was a Haake grounds of Ex. 21, and pellets for Ex. 22 and Ex. 23. The samples were held at 400° C. for 30 minutes with 6 minutes dwell time while viscosity was monitored. The most notable observation from this data is that Ex. 21 demonstrated no significant change in viscosity after 30 minutes, indicating no further reactions from the end groups at this condition (results similar to Ex. 22). On the contrary, the melt stability difference between Ex. 21 and Ex. 23 is more pronounced. The polyetherimide of Ex. 21 showed minimal change in viscosity (<5%) at the end of 30 minutes, whereas the comparative Ex. 23 showed significant change in melt viscosity as evidenced by approximately 33% increase in the viscosity at the end of 30 min (FIG. 3). The increase in viscosity implies the crosslinking reaction which makes Ex. 23 material less stable and difficult to process, especially for the temperature relevant to extreme molding conditions. However, the polyetherimide of Ex. 21 showed superior melt stability at temperatures relevant to extreme molding conditions.

The Ex. 22 and Ex. 23 polymers are optically clear, and show high transmittance of light in the visible (Vis) and near IR-range (NIR). These polymers are transparent in their natural state but not colorless. The light transmission (% T) was measured on compression molded discs using Perkin Elmer LAMBDA 950 which is capable of testing across the 175 nm (UV) to 3300 nm (NIR) range. The discs used for measurement had thickness of 1.12-1.20 mm. The % transmission was primarily measured at 850 nm, 1310 nm, and 1550 nm wavelengths that are critical to data communication applications. The results are summarized in Table 4. The polyetherimide of Ex. 21 and Ex. 24 showed comparable to slightly lower % transmission as that of comparative samples Ex. 22 and Ex. 23. The variation of % T could potentially be introduced with bad surface quality, part thickness variation, molded-in stress, black specks, and haze. The disc of polyetherimide of Ex. 21 was molded from a powder (comparative samples were molded from pellets) which caused air bubbles and poor surface quality in the discs. This was attributed to the lower percent transmission (% T) seen for Ex. 21.

The tensile strength at yield were also measured of the molded parts of Ex. 21 and compared with Ex. 22 to and Ex. 24 (Table 4). The polyetherimide of Ex. 21 showed improvement in tensile strength compared to the comparative examples, roughly a 10% improvement in tensile strength at yield was observed.

TABLE 4

|  | Ex. 21 | Ex. 22* | Ex. 23* | Ex. 24 |
|---|---|---|---|---|
| Components |  |  |  |  |
| 3-ClPA (mol %) | 50 | 5 | 98 | 90 |
| 4-ClPA (mol %) | 50 | 95 | 2 | 10 |
| mPD (mol %) | 100 | 100 | 0 | 100 |
| DDS (mol %) | 0 | 0 | 100 | 0 |
| BPANa$_2$ (mol %) | 0 | 100 | 100 | 0 |
| BPNA$_2$ (mol %) | 60 | 0 | 0 | 60 |
| SBINa$_2$ (mol %) | 40 | 0 | 0 | 40 |
| Properties |  |  |  |  |
| Mw (g/mol) | 55,600 | 55,000 | 55,200 | 43,927 |
| Mn (g/mol) | 22,300 | 24,000 | 21,100 | 13414 |
| PDI | 2.49 | 2.4 | 2.61 | 3.27 |
| Cyclics [n = 1] (wt %) | <0.15 | 0.1 | <0.25 | 1.30 |
| Tg (° C.) | 262 | 217 | 267 | 261.47 |
| TGA (° C., Onset T, Air) | 509.70 | 511.24 | 485.67 | 530.13 |
| TGA (° C., Onset T, Nitrogen) | 504.75 | 516.47 | 485.08 | 525.37 |
| CTE, 50-170° C. (1/° C.) | 41.96 | 48.09 | 47.15 | 44.30 |
| Water absorption (23° C., sat., %) | 0.85 | 0.54 | 1.29 | 0.89 |
| Tensile strength at yield (psi) | 16400 | 15930 | 14900 | — |
| % T at 850 nm | >82 | >89 | >82 | >82 |
| % T at 1310 nm | >85 | >89 | >88 | >82 |
| % T at 1550 nm | >85 | >89 | >88 | >82 |
| Film Thickness (mm) | 1.20 | 1.15 | 1.12 | 1.20 |
| Film Quality | Highly Creasable | Highly Creasable | Creasable | Moderately Creasable |
| Rheology Ratio | 13.91 | 5.45 | 10.18 | 6.65 |

*denotes Comparative Example

The compositions, methods, and articles are further illustrated by the following non-limiting embodiments.

Embodiment 1

A polymer composition comprising a polyetherimide comprising repeating units of formula (1) and formula (2) wherein the repeating units of formula (1) are present in an amount of at least 10 mole %, preferably 20 to 100 mole %, more preferably 20 to 80 mole %; Z is independently at each occurrence derived from a biphenol, preferably a 4,4'-biphenol; Z' is independently at each occurrence derived from a compound of formulas (3) to (13), preferably a group derived from spirobiindane bisphenol, bisphenol A, 1,2-dihydroxybenzene, isophorone bisphenol, 1,1-bis(4-hydroxyphenyl)-1-phenyl-ethane, or dimethylindanone bisphenol, 3,3'-dimethylbisphenol cyclohexane, fluorenone bisphenol; and R is independently at each occurrence as a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof; wherein the polyetherimide has a Tg of greater than 200° C., or 220 to 290° C., or 250 to 290° C.

Embodiment 2

The polymer composition of embodiment 1 or 2, wherein the polyetherimide has a weight average molecular weight of at least 20,000 grams per mole, preferably 20,000 to 100,000 grams per mole, more preferably 20,000 to 60,000 grams per mole; a maximum hydroxyl polymer endgroup content of 700 parts per million by weight; or both; and the polymer composition has less than 3000 part per million of a chloride, based on the total parts of polyetherimide, preferably a maximum chloride content of less than 900 parts per million by weight.

Embodiment 3

The polymer composition of any one or more of embodiments 1 to 2, wherein the polyetherimide is prepared from a bis(halophthalimide) a bis(halophthalimide) of the formula

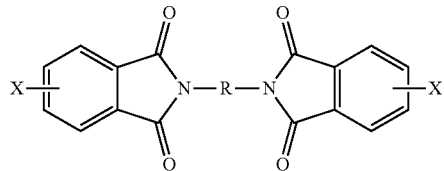

wherein each occurrence of X is independently fluoro, chloro, bromo, iodo, or nitro; and R is as defined in Embodiment 1.

Embodiment 4

The polymer composition of embodiment 3, wherein the polyetherimide is prepared by a method comprising contacting the bis(halophthalimide) composition and an alkali metal salt of a dihydroxy compound of the formula $M^{+-}O$—Z—$O^{-+}M$ and $M^{+-}O$—Z'—$O^{-+}M$; wherein M is an alkali metal; and Z and Z' are as defined in embodiment 1; under conditions effective to provide the polyetherimide.

Embodiment 5

The polymer composition of embodiment 3 or 4, wherein the ratio of alkali metal salt of the dihydroxy compound to bis(halophthalimide) composition is 0.9:1.0 to 1.0:0.9.

Embodiment 6

The polymer composition of any one or more of embodiments 3 to 5, wherein the contacting is in the presence of an endcapping agent, preferably 2 to 4 mole percent of an endcapping agent.

Embodiment 7

The polymer composition of any of one or more embodiments 1 to 6, wherein Z is a group derived from 4,4'-biphenol, Z' is a group derived from 6,6'-dihydroxy-3,3,3',3'-tetramethylspiro(bis)indane, and R is an m-phenylene group.

Embodiment 8

The polymer composition of any one or more of embodiments 1 to 7, wherein the polymer composition comprises less than 2 weight percent of cyclic oligomers, preferably less than 1.25 weight percent; more preferably less than 0.5 weight percent of cyclic oligomers.

Embodiment 9

The polymer composition of any one or more of embodiments 1 to 8, wherein the polymer composition has an onset decomposition temperature of greater than 500° C. as determined using thermogravimetric analysis in air.

Embodiment 10

The polymer composition of any one or more of embodiments 1 to 9, wherein the polymer composition has a water uptake of less than 1 percent, preferably less than 0.7 percent.

Embodiment 11

The polymer composition of any one or more of embodiments 1 to 10, wherein the polymer composition has a coefficient of thermal expansion of 30 to 60 ppm/° C., or 35 to 55 ppm/° C., or 39 to 50 ppm/° C., or 40 to 49 ppm/° C., as determined according to ASTM E 831.

Embodiment 12

The polymer composition of any one or more of embodiments 1 to 11, wherein the molar ratio of Z to Z' is 10:90 to 100:0, preferably 30:70 to 70:30, more preferably 40:60 to 60:40.

Embodiment 13

The polymer composition of any one or more of embodiments 1 to 12, wherein Z is a group derived from 4,4'-biphenol; Z' is a group derived from 6,6'-dihydroxy-3,3,3',3'-tetramethylspiro(bis)indane; and the molar ratio of Z to Z' is 10:90 to 100:0, preferably 30:70 to 70:30, more preferably 40:60 to 60:40; and R is a meta-phenylene group.

Embodiment 14

The polymer composition of any one or more of embodiments 1 to 13, having a transparency of at least 82% at one or more of 850 nm, 1310 nm, and 1550 nm as determined on a 1.2 mm thick part.

Embodiment 15

The polymer composition of any one or more of embodiments 1 to 14, wherein the polyetherimide in molten form that has been exposed to a temperature of at least 380° C. for at least 5 minutes has a viscosity that is greater than or equal to 95% of the initial viscosity of the polyetherimide.

Embodiment 16

The polymer composition of any one or more of embodiments 1 to 15, wherein the polymer composition retains a melt stability that is at least 95% of the initial melt stability following exposure to a temperature of 400° C. for 30 minutes.

Embodiment 17

The polymer composition of any one or more of embodiments 1 to 16, further comprising a residual catalyst, impact modifier, filler, reinforcing agent, anti-oxidant, thermal stabilizer, light stabilizer, ultraviolet light absorber, quencher, plasticizer, lubricant, mold release agents anti-static agent, colorant, blowing agent, flame retardant, anti-drip agent, radiation stabilizer, or a combination comprising at least one of the foregoing.

Embodiment 18

A method for the manufacture of a polyetherimide composition, the method comprising reacting, preferably using molar ratio of an alkali metal salt of a dihydroxy aromatic compound of the formula $M^{+-}O-Z-O^{-+}M$ and $M^{+-}O-Z'-O^{+-}M$ to a bis(halo)phthalimide composition of 1.0:0.9 to 0.9:1.0, the bis(halo)phthalimide composition comprising, based on the weight of the bis(halophthalimide) composition, at least 15 wt. % of a 3,3-bis(halophthalimide) of formula (7), more than 47 to less than 85 wt. % of a 4,3'-bis(halophthalimide) of formula (8), and more than 0 to less than 27 wt. % of a 4,4'-bis(halophthalimide) of formula (9); under conditions effective to provide the polyetherimide, and wherein in the foregoing formulas M is an alkali metal, Z is independently at each occurrence derived from a biphenol group, preferably a 4,4'-biphenol group, Z' is independently at each occurrence a group derived from bisphenol A, 1,2-dihydroxybenzene, 1,1-bis(4-hydroxyphenyl)-1-phenyl-ethane, isophorone bisphenol (1,1-bis(4-hydroxyphenyl)-3,3,5-trimethylcyclohexane), spirobiindane bisphenol, dimethylindanone bisphenol, 3,3'-dimethylbisphenol cyclohexane, fluorenone bisphenol, X is independently at each occurrence fluoro, chloro, bromo, iodo or nitro, and R is independently at each occurrence a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof.

Embodiment 19

The method of embodiment 18, further comprising adding a monophenol or the corresponding alkali metal salt thereof, preferably sodium phenoxide, more preferably sodium para-cumyl phenol.

Embodiment 20

The method of embodiments 18 or 19, wherein the contacting is in the presence of a catalyst, preferably wherein the catalyst is a quaternary ammonium salt, guanidinium salt, pyridinium salt, imidazolium salt, or a combination comprising at least one of the foregoing, more preferably wherein the catalyst is a hexaalkylguanidinium salt, even more preferably wherein the catalyst is hexaethylguanidinium chloride.

Embodiment 21

The method of any one or more of embodiments 18 to 20, wherein the polyetherimide composition comprises less than 1000 ppm of residual catalyst, based on the weight of a polyetherimide.

Embodiment 22

The method of any one or more of embodiments 18 to 21, wherein the polyetherimide composition has a Tg of greater than 200° C., or 220 to 290° C., or 25 to 290° C.; a weight average molecular weight of at least 20,000 grams per mole, preferably 20,000 to 100,000 grams per mole, more preferably 20,000 to 60,000 grams per mole; a maximum chloride content of less than 900 ppm by weight; and a maximum hydroxyl polymer endgroup content of 700 parts per million by weight.

Embodiment 23

A method for the manufacture of a polymer composition, the method comprising reacting an aromatic bis(ether phthalic anhydride) of formula (12) and (13) with an aromatic diamine of the formula $H_2N-R-NH_2$ to provide a polyetherimide, wherein in the foregoing formulas Z is independently at each occurrence derived from a biphenol group, preferably a 4,4'-biphenol group; and Z' is independently at each occurrence a group derived from bisphenol A, 1,2-dihydroxybenzene, 1,1-bis(4-hydroxyphenyl)-1-phenyl-ethane, isophorone bisphenol (1,1-bis(4-hydroxyphenyl)-3,3,5-trimethylcyclohexane), spirobiindane bisphenol, dimethylindanone bisphenol, 3,3'-dimethylbisphenol cyclohexane, or fluorenone bisphenol; R is independently at each occurrence a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof.

Embodiment 24

The method of any of embodiments 18 to 23, wherein R is a meta-phenylene group.

Embodiment 25

An article comprising the polymer composition of any one or more of embodiments 1 to 17.

Embodiment 26

The article of embodiment 25, wherein the article is an injection molded part, a film, a sheet, a multilayer sheet, a multilayer film, a multilayered laminate, a molded part, an extruded shape, a coated part, a pellet, a powder, a foam, a fiber, a flaked fiber, tubing, an extruded sheet, an extruded film, an extruded fiber, or an extruded stock shape.

Embodiment 27

The article of embodiment 25 or 26, wherein the article is an optical lens, an infrared lens, optical fiber connector, an electrical connector, an electronic connector, an LED reflector, a printed circuit board substrate, or a reflector for automotive headlamp, a reflector for an electronic device, a heat sink for an LED device, a foamed aircraft panel, an automobile component, or an infrared transparent window or covering.

Embodiment 28

A method of forming the article of any one or more of embodiments 25 to 27, comprising shaping, extruding, laminating, thermoforming, blow molding, or injection molding the polymer composition of any one or more of embodiments 1 to 19 to form the article.

In general, the compositions, methods, and articles can alternatively comprise, consist of, or consist essentially of, any appropriate components herein disclosed. The compositions, methods and articles can additionally, or alternatively, be formulated so as to be devoid, or substantially free, of any components, materials, ingredients, adjuvants, steps, or species used in the prior art compositions or methods that are otherwise not necessary to the achievement of the function and/or objectives of the present invention.

All ranges disclosed herein are inclusive of the endpoints, and the endpoints are independently combinable with each other. "Combination" is inclusive of blends, mixtures, alloys, reaction products, and the like. "Or" means "and/or." Furthermore, the terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. In addition, it is to be understood that the described elements can be combined in any suitable manner in the various embodiments.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—$CH_2$—) or propylene (—$(CH_2)_3$—)). "Alkenyl" and "alkenylene" mean a monovalent or divalent, respectively, straight or branched chain hydrocarbon group having at least one carbon-carbon double bond (e.g., ethenyl (—HC=$CH_2$) or propenylene (—HC($CH_3$)=$CH_2$—). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —$C_nH_{2n-x}$ and —$C_nH_{2n-2x}$— wherein x is the number of cyclizations. "Aryl" means a monovalent, monocyclic or polycyclic aromatic group (e.g., phenyl or naphthyl). "Arylene" means a divalent, monocyclic or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro (—$NO_2$), cyano (—CN), hydroxy (—OH), halogen, thiol (—SH), thiocyano (—SCN), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g, benzyl), $C_{7-12}$ alkylarylene (e.g, toluyl), $C_{4-12}$ heterocycloalkyl, $C_{3-12}$ heteroaryl, $C_{1-6}$ alkyl sulfonyl (—S(=O)$_2$-alkyl), $C_{6-12}$ arylsulfonyl (—S(=O)$_2$-aryl), or tosyl ($CH_3C_6H_4SO_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

All cited patents, patent applications, and other references are incorporated herein by reference in their entirety. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:
1. A polymer composition comprising a polyetherimide comprising repeating units of formula (1) and formula (2)

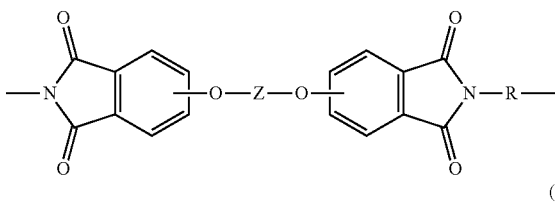

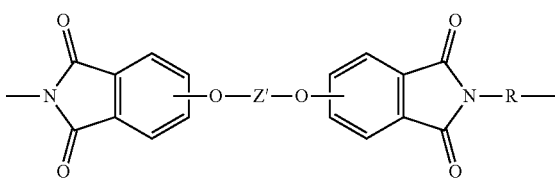

wherein
- the repeating units of formula (1) are present in an amount of at least 10 mole %;
- Z is independently at each occurrence derived from a biphenol;
- Z' is independently at each occurrence a group derived from

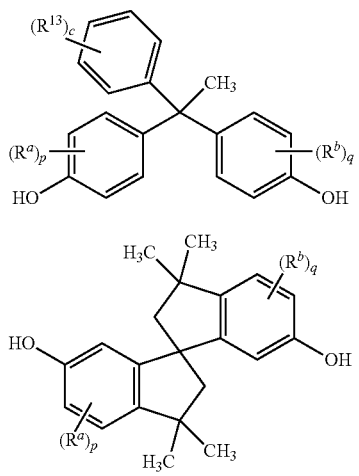
(5)

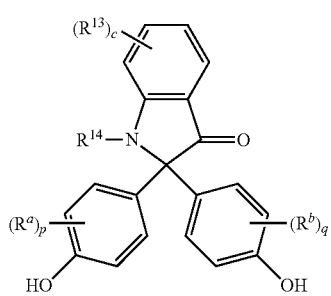
(6)

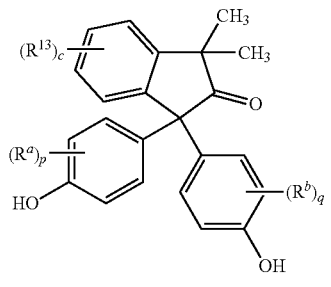
(7)

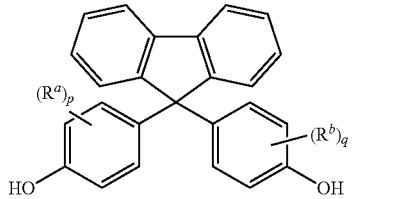
(8)

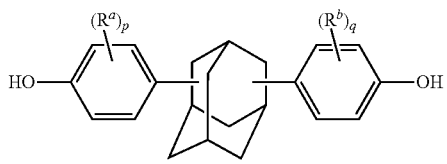
(9)

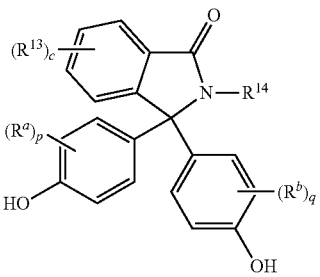
(10)

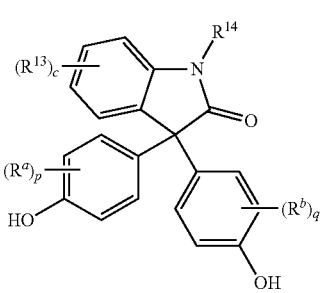
(12)

or

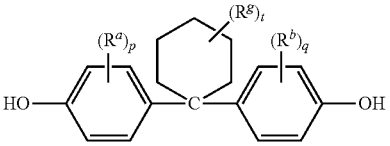
(13)

wherein $R^a$ and $R^b$ at each occurrence are each independently halogen, $C_{1-12}$ alkyl, $C_{2-12}$ alkenyl, $C_{3-8}$ cycloalkyl, or $C_{1-12}$ alkoxy; p and q at each occurrence are each independently 0 to 4; $R^{13}$ at each occurrence is independently halogen or $C_{1-6}$ alkyl; c at each occurrence is independently 0 to 4; $R^g$ at each occurrence is independently halogen or $C_{1-12}$ alkyl, or two $R^g$ groups together with the carbon atoms to which they are attached form a four-, five-, or six-membered cycloalkyl group; and t is 0 to 10; and R is independently at each occurrence is a $C_{6-20}$ aromatic hydrocarbon group or a halogenated derivative thereof, a straight or branched chain $C_{2-20}$ alkylene group or a halogenated derivative thereof, or a $C_{3-8}$ cycloalkylene group or a halogenated derivative thereof;

wherein the polyetherimide has a Tg of greater than 200° C.

2. The polymer composition of claim 1, wherein the polyetherimide has at least one of:
- a weight average molecular weight of at least 20,000 grams per mole;
- a maximum hydroxyl polymer endgroup content of 700 parts per million by weight; and
- further wherein the polymer composition comprises less than 3000 part per million of a chloride, based on the total parts of polyetherimide.

3. The polymer composition of claim 1, wherein the polyetherimide is prepared from a bis(halophthalimide) of the formula

wherein each occurrence of X is independently fluoro, chloro, bromo, iodo, or nitro; and R is independently at each occurrence is a $C_{6-20}$ aromatic hydrocarbon group or a halogenated derivative thereof, a straight or branched chain $C_{2-20}$ alkylene group or a halogenated derivative thereof, or a $C_{3-8}$ cycloalkylene group or a halogenated derivative thereof.

4. The polymer composition of claim 3, wherein the polyetherimide is prepared by a method comprising contacting the bis(halophthalimide) composition and an alkali metal salt of a dihydroxy compound of the formula $$M^+\text{—O—Z—O}^{-+}M \text{ and } M^{+-}O\text{—Z'—O}^{-+}M;$$

under conditions effective to provide the polyetherimide, wherein

M is an alkali metal;

Z is independently at each occurrence derived from a biphenol; and

Z' is independently at each occurrence a group derived from (5)
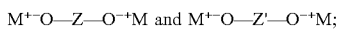

(6)
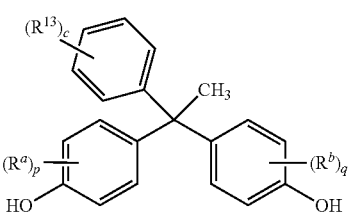

(7)
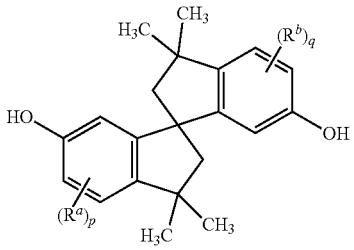

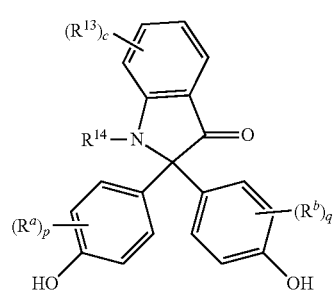

(8)
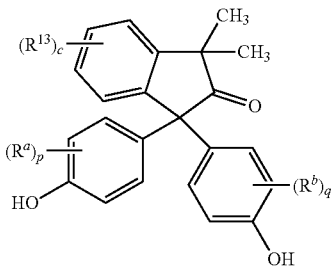

(9)
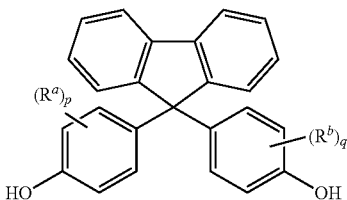

(10)
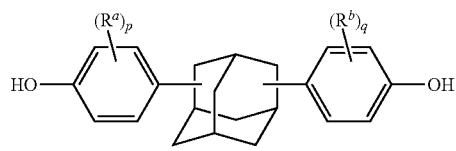

(10)
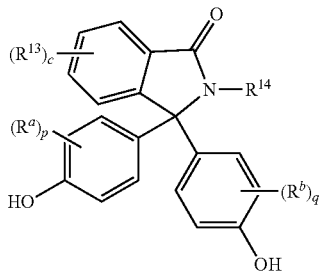

(12)
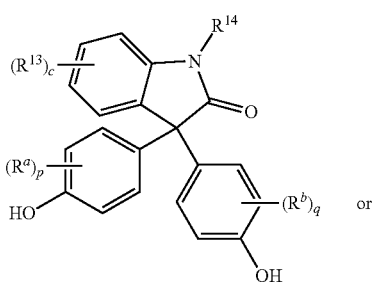
or

(13)
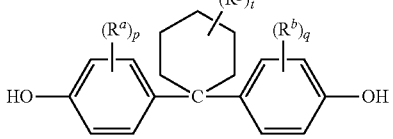

wherein $R^a$ and $R^b$ at each occurrence are each independently halogen, $C_{1-12}$ alkyl, $C_{2-12}$ alkenyl, $C_{3-8}$ cycloalkyl, or $C_{1-12}$ alkoxy; p and q at each occurrence are each independently 0 to 4; $R^{13}$ at each occurrence is independently halogen or $C_{1-6}$ alkyl; c at each occurrence is independently 0 to 4; $R^g$ at each occurrence is independently halogen or $C_{1-12}$ alkyl, or two $R^g$ groups together with the carbon atoms to which they are attached form a four-, five-, or six-membered cycloalkyl group; and t is 0 to 10.

5. The polymer composition of claim 3, wherein the molar ratio of alkali metal salt of the dihydroxy compound to bis(halophthalimide) is from 0.9:1.0 to 1:0:0.9.

6. The polymer composition of claim 3, wherein the contacting is in the presence of an endcapping agent.

7. The polymer composition of claim 1, wherein Z is a group derived from 4,4'-biphenol, Z' is a group derived from 6,6'-dihydroxy-3,3,3',3'-tetramethylspiro(bis)indane, 1,2-dihydroxybenzene, isophorone bisphenol, 1,1-bis(4-hydroxyphenyl)-1-phenyl-ethane, dimethylindanone bisphenol, 3,3'-dimethylbisphenol cyclohexane, fluorenone bisphenol or a combination comprising at least one of the foregoing, and R is an m-phenylene group.

8. The polymer composition of claim 1, wherein the polymer composition
comprises less than 2 weight percent of cyclic oligomers; or
has an onset decomposition temperature of greater than 500° C. as determined using thermogravimetric analysis in air; or
has a water uptake of less than 1 percent; or
has a coefficient of thermal expansion of 30 to 60 ppm/° C., as determined according to ASTM E 831.

9. The polymer composition of claim 1, wherein the molar ratio of Z to Z' is 30:70 to 70:30.

10. The polymer composition of claim 1, wherein
Z is a group derived from 4,4'-biphenol;
Z' is a group derived from 6,6'-dihydroxy-3,3,3',3'-tetramethylspiro(bis)indane; and
the molar ratio of Z to Z' is 30:70 to 70:30; and
R is a meta-phenylene group.

11. The polymer composition of claim 1,
having a transparency of at least 82% at one or more of 850 nm, 1310 nm, and 1550 nm as determined on a 1.2 mm thick part; or
wherein the polyetherimide in molten form that has been exposed to a temperature of at least 380° C. for at least 5 minutes has a viscosity that is greater than or equal to 95% of the initial viscosity of the polyetherimide; or
wherein the polymer composition retains a melt stability that is at least 95% of the initial melt stability following exposure to a temperature of 400° C. for 30 minutes.

12. A method for the manufacturer of a polyetherimide composition, the method comprising reacting
an alkali metal salt of a dihydroxy aromatic compound of the formula

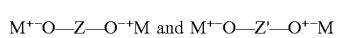

with a bis(halo)phthalimide, preferably in a molar ratio of 1.0:0.9 to 0.9:1.0, of the formula,

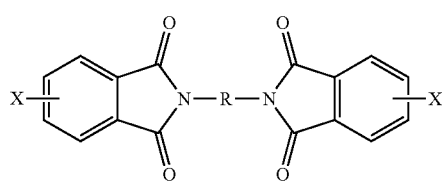

under conditions effective to provide the polyetherimide, and wherein in the foregoing formulas
M is an alkali metal,
Z is independently at each occurrence derived from a biphenol group,
Z' is independently at each occurrence a group derived from 1,1-bis(4-hydroxyphenyl)-1-phenyl-ethane, isophorone bisphenol (1,1-bis(4-hydroxyphenyl)-3,3,5-trimethylcyclohexane), spirobiindane bisphenol, dimethylindanone bisphenol, 3,3'-dimethylbisphenol cyclohexane, or fluorenone bisphenol,
X is independently at each occurrence fluoro, chloro, bromo, iodo or nitro, and
R is independently at each occurrence a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof.

13. The method of claim 12, wherein the contacting is
in the presence of a monophenol or the corresponding alkali metal salt thereof; or
in the presence of a catalyst.

14. The method of claim 12, wherein the polyetherimide composition comprises less than 1000 ppm of residual catalyst, based on the weight of a polyetherimide.

15. The method of claim 12, wherein the polyetherimide composition has
a Tg of greater than 200° C.;
a weight average molecular weight of at least 20,000 grams per mole;
less than 3000 part per million of a chloride based on the total parts of polyetherimide; and
a maximum hydroxyl polymer endgroup content of 700 parts per million by weight.

16. A method for the manufacturer of a polyetherimide composition, the method comprising reacting an aromatic bis(ether phthalic anhydride) of formula (12) and (13)

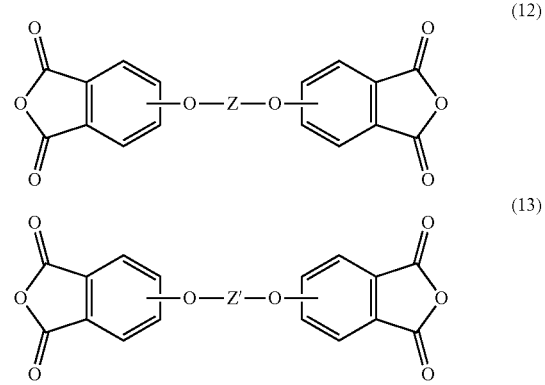

with an aromatic diamine of the formula

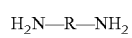

to provide a polyetherimide, wherein in the foregoing formulas
Z is independently at each occurrence derived from a biphenol group; and
Z' is independently at each occurrence a group derived from 1,1-bis(4-hydroxyphenyl)-1-phenyl-ethane, isophorone bisphenol (1,1-bis(4-hydroxyphenyl)-3,3,5-trimethylcyclohexane), spirobiindane bisphenol, dimethylindanone bisphenol, 3,3'-dimethylbisphenol cyclohexane, or fluorenone bisphenol;
R is independently at each occurrence a $C_{6-20}$ aromatic hydrocarbon group or a halogenated derivative thereof, a straight or branched chain $C_{2-20}$ alkylene group or a halogenated derivative thereof, or a $C_{3-8}$ cycloalkylene group or a halogenated derivative thereof.

17. The method of claim 12, wherein R is a metaphenylene group.

18. An article comprising the polymer composition of claim 1.

19. The article of claim 18, wherein
the article is an injection molded part, a film, a sheet, a multilayer sheet, a multilayer film, a multilayered laminate, a molded part, an extruded shape, a coated part, a pellet, a powder, a foam, a fiber, a flaked fiber, an extruded sheet, an extruded film, an extruded fiber, tubing, or an extruded stock shape.

20. A method of forming the article of claim 18, comprising shaping, extruding, blow molding, injection molding, thermoforming, or laminating the polymer composition of claim 1 to form the article.

* * * * *